(12) United States Patent
Imming et al.

(10) Patent No.: US 9,454,744 B2
(45) Date of Patent: Sep. 27, 2016

(54) ASSET TRACKING IN PROCESS CONTROL ENVIRONMENTS

(75) Inventors: David P. Imming, Austin, TX (US); Peter Zornio, Austin, TX (US); Trevor D. Schleiss, Austin, TX (US); Neil J. Peterson, Austin, TX (US); Mark J. Nixon, Round Rock, TX (US); Eric D. Rotvold, West St. Paul, MN (US); Robert J. Karschnia, Chaska, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 305 days.

(21) Appl. No.: 13/224,408

(22) Filed: Sep. 2, 2011

(65) Prior Publication Data

US 2013/0060351 A1 Mar. 7, 2013

(51) Int. Cl.
| | |
|---|---|
| *G05B 11/01* | (2006.01) |
| *G06Q 10/08* | (2012.01) |
| *H04W 4/02* | (2009.01) |
| *H04W 4/04* | (2009.01) |
| *H04L 29/08* | (2006.01) |

(52) U.S. Cl.
CPC ............ *G06Q 10/08* (2013.01); *H04L 67/12* (2013.01); *H04W 4/028* (2013.01); *H04W 4/043* (2013.01)

(58) Field of Classification Search
CPC ..... G06Q 10/08; H04L 67/12; H04W 4/043; H04W 4/028
USPC .......................................... 700/1, 11, 12, 13
See application file for complete search history.

(56) References Cited

U.S. PATENT DOCUMENTS

| | | | |
|---|---|---|---|
| 7,640,007 B2 | 12/2009 | Chen et al. | |
| 2003/0061295 A1* | 3/2003 | Oberg et al. | ................. 709/208 |
| 2006/0206882 A1* | 9/2006 | Illowsky | ............... G06F 1/3203 |
| | | | 717/144 |
| 2008/0109098 A1 | 5/2008 | Moshier et al. | |
| 2008/0122641 A1 | 5/2008 | Amidi | |
| 2008/0279155 A1* | 11/2008 | Pratt, Jr. | ................ H04L 12/66 |
| | | | 370/336 |

(Continued)

FOREIGN PATENT DOCUMENTS

| | | |
|---|---|---|
| WO | WO-2012/014008 A1 | 2/2012 |
| WO | WO-2012/129043 A2 | 9/2012 |

OTHER PUBLICATIONS

"Using GPS Indoors" Bapco Journal, Bapco, 2011, Aug. 18, 2005, http://www.bapcojournal.com/news/fullstory.php/aid/30/Using_GPS_indoors.html, 4 pages.

*Primary Examiner* — Mohammad Ali
*Assistant Examiner* — Ziaul Karim
(74) *Attorney, Agent, or Firm* — Marshall, Gerstein & Borun LLP

(57) ABSTRACT

An asset tracking system for use in a process control environment may include one or more asset tracking devices and an asset tracking host. The asset tracking device may receive signals corresponding to a position or location of an asset to be tracked, and may communicate, using an industrial automation protocol such as wireless HART, an indication of the position to the asset tracking host. The signals may be GPS signals that are re-radiated into the process control environment. Other information, such as environmental data, may be communicated in conjunction with the position of the asset. The asset tracking host may store and/or display the data or information included in the message, and may send a different message to the asset tracking device. An asset tracking device may be included in a field device, a network device, or a portable communications device used in the process control environment.

43 Claims, 10 Drawing Sheets

(56) References Cited

U.S. PATENT DOCUMENTS

2009/0010204 A1* 1/2009 Pratt et al. .................. 370/328
2010/0272093 A1  10/2010 Raravi et al.
2012/0236768 A1* 9/2012 Kolavennu et al. .......... 370/310

* cited by examiner

ASSET TRACKING IN PROCESS CONTROL ENVIRONMENTS

FIELD OF TECHNOLOGY

The present invention relates generally to tracking assets in a process control environment and, more particularly, to tracking assets by using an industrial automation protocol of the process control environment.

BACKGROUND

In large manufacturing or industrial plants, tracking physical and/or human assets is critical to efficiency, productivity and safety. Knowing the location of human assets or personnel may reduce the time needed to notify personnel of emergency situations and to respond to hazardous conditions such as accidental chemical leaks or dire weather conditions. Knowing the location of physical assets (e.g., parts, devices, equipment, etc.) may enable direct physical location of a particular asset, thus increasing the productivity of operators and/or other personnel. Currently known techniques for locating human and/or physical assets, however, suffer from poor location accuracy and expensive infrastructure requirements. Furthermore, some known techniques are hindered by harsh industrial environments such as buildings, large amounts of metal, and interfering technologies that are used within industrial plants.

SUMMARY

In an embodiment, an asset tracking method performed by an asset tracking device may include obtaining, by the asset tracking device, positioning data or other information indicative of a spatial location corresponding to the asset tracking device or corresponding to an asset that is desired to be tracked. The asset tracking device may be communicatively coupled to a communication network operating according to an industrial automation protocol. In an embodiment, the industrial automation protocol is a wireless HART® (Highway Addressable Remote Transducer) protocol. The asset tracking method may include generating a message that conforms to the industrial automation protocol and that includes a position indication field to indicate a spatial position of the asset or the asset tracking device. The position indication field may be populated with at least a portion of the positioning data or the information indicative of the spatial location. The method may include causing the message to be transmitted from the asset tracking device to an asset tracking host via the communication network using the industrial automation protocol.

An embodiment of an asset tracking device is disclosed. The asset tracking device may be coupled to a communication network of a process control environment that operates according to an industrial automation protocol, such as the wireless HART protocol. The asset tracking device may include a network interface that transmits and receives messages over the communication network, a positioning module that determines a spatial location or position of the asset tracking device or of a target device operating as a node in the communication network, and a message generation unit to generate a message including a position indication field that is populated with an indication of the spatial location or position. The message generation unit may cause the message to be transmitted from the asset tracking device to an asset tracking host via the communication network using the industrial automation protocol.

In an embodiment, an asset tracking method performed by an asset tracking host may include receiving, at the asset tracking host via a communication network, a message conforming to an industrial automation protocol. In an embodiment, the industrial automation protocol is a wireless HART protocol. The message may include positioning data corresponding to (or information indicative of) a spatial position of an asset tracking device or of a spatial position of an asset that is desired to be tracked. The method may include retrieving an asset device description associated with the asset tracking device or associated with the asset that is desired to be tracked, and generating asset tracking information based on the positioning data and the asset device description. The asset tracking information may be stored in a data storage device, and may be presented on a user interface.

An embodiment of an asset tracking host may include a network interface that is communicatively coupled to communication network operating in a process control environment according to an industrial automation protocol, such as the wireless HART protocol. The industrial automation protocol may include messages defined specifically for communicating data related to controlling or monitoring process variables in the process control environment. The asset tracking host may include an asset tracking unit configured to receive a message that includes positioning data or information indicative of a spatial position of an asset. The asset tracking unit may retrieve a corresponding asset device description and generate asset tracking information based on the asset device description and the positioning data or information.

An embodiment of an asset tracking system operating in a process control environment may include a communication network that has a plurality of nodes and that communicates using an industrial automation protocol, such as the wireless HART protocol. The asset tracking system may include an asset tracking host, a plurality of field devices, and an asset tracking device. The asset tracking device may be configured to generate positioning information or positioning data indicative of a spatial position of the asset tracking device, and to provide the positioning information or data to one of the plurality of field devices. The receiving field device may transmit, to the asset tracking host, at least a portion of the positioning information or data in a message that conforms to the industrial automation protocol.

DETAILED DESCRIPTION

Figure 1:
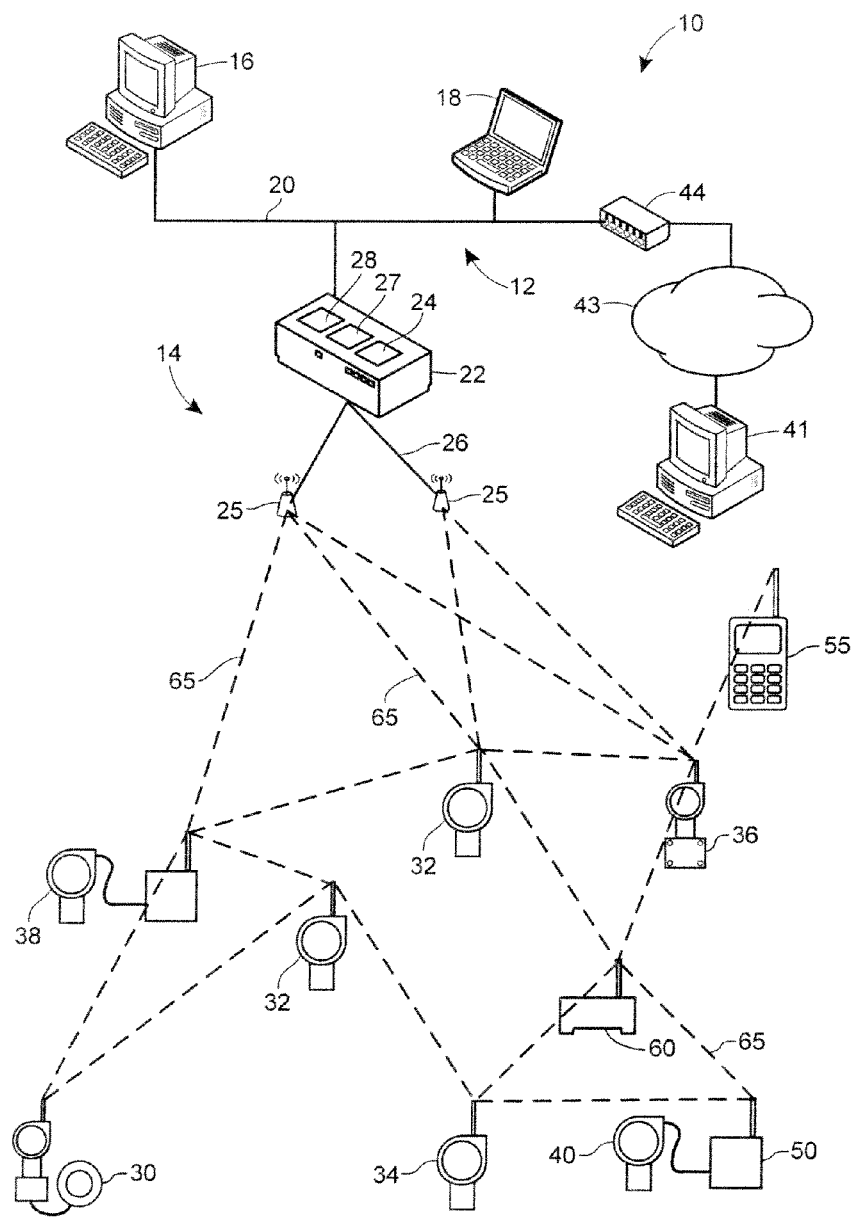
FIG. 1 is a block diagram that illustrates an example system in which the techniques of the present disclosure may operate.

FIG. 1 illustrates an example system 5 in which the asset tracking devices, methods, apparatuses, systems and/or techniques described herein may operate. The system 5 may include a process control environment of a process control plant, a sensor network, an industrial or manufacturing plant, a factory, or any other environment in which process control techniques and strategies are used. The term "asset," as used herein, refers to a biological or physical entity associated with the process control environment. For example, a biological asset may be a human being such as an operator, maintenance person, or any employee or contractor performing tasks corresponding to the process control environment. In another example, a biological asset may be a dog or other animal (typically, but not necessarily, co-located with a human being) that is trained to detect hazardous or illegal substances. In fact, a biological asset need not perform process control related tasks at all, but may be any person or animal that is physically within the confines or boundaries of the process control environment, such as an inspector, a student, or a visitor. Generally, a biological asset may be any biological entity whose whereabouts within the process control environment 102 may be desirable to know or to track.

A physical asset may be a device, a piece of equipment, or a sub-component thereof that is associated with or used in the process control environment. A physical asset may be a raw material provided as an input into the process control environment, an intermediate material produced or generated by the process control environment, a batch or other output material produced or generated by the process control environment, or the like. A physical asset may have a fixed or a variable location. For example, a physical asset may be a field device in a generally fixed location such as a sensor, a valve, a pump, a tank, etc. A physical asset may correspond to a particular fixed location, e.g., a joint, a weld, or a "Y" connection along a stretch of pipe, for example. A physical asset may correspond to a plant facility characteristic such as a cooling fan, an air inlet or outlet, a sprinkler head, or a floor drain, for example. In some cases, a physical asset may have a variable location, such as when the physical asset corresponds to a portable piece of equipment such as testing equipment, computing devices, and the like. Generally, a physical asset is any physical entity used by the process control environment whose whereabouts or location within the process control environment 102 may be desirable to know or to track.

As shown in FIG. 1, the system 5 may include a communication network 10 that operates according to one or more industrial automation protocols. In particular, the network 10 may include a plant automation network 12 that utilizes or operates according to an industrial automation protocol (e.g., HART® (Highway Addressable Remote Transducer), Profibus DP (Decentralized Peripherals), etc.) or some other communication protocol (e.g., Ethernet, RS-485, etc.). The network 10 may also include a wireless plant automation network 14 that utilizes or operates according to a wireless industrial automation protocol, such as a wireless HART communication protocol, ZigBee®, ISA (International Society of Automation) standard, or some other wireless network protocol that supports direct communication between field devices or sensors of the plant automation network 12. For clarity, the discussion herein refers to the wireless HART communication protocol, although the techniques and principles described herein may apply to wireless plant automation networks that utilize or operate according to wireless industrial automation protocols in addition to or instead of wireless HART.

It should be noted that while FIG. 1 illustrates the communication network 10 as including both a plant automation network 12 (that is, for the most part, wired) and a wireless communication network 14 connected via a gateway 22, in some embodiments, the network 10 may include only the plant automation network 12 or only the wireless communication network 14. In some embodiments, the wireless communication network 14 may be a wireless mesh communication network, an example of which is described in U.S. patent application Ser. No. 12/201,734, filed Aug. 29, 2008 and entitled "CONFIGURING AND OPTIMIZING A WIRELESS MESH NETWORK," the entire disclosure of which is hereby expressly incorporated herein by reference.

The plant automation network 12 may include one or more stationary workstations 16 and one or more portable workstations 18 connected over a communication backbone 20. The gateway 22 may be connected to the backbone 20 in a wired manner and may communicate with the plant automation network 12 using a suitable protocol. The gateway 22 may be implemented as a standalone device, as a card insertable into an expansion slot of the hosts or workstations 16 or 18, as part of the IO subsystem of a PLC-based or DCS-based system, or in any other manner. The gateway 22 may provide, to applications running on the network 12, access to various devices of the wireless communication network 14. In addition to protocol and command conversion, the gateway 22 may provide synchronized clocking used by time slots and superframes (sets of communication time slots spaced equally in time) of the scheduling scheme of the wireless communication network 14.

In some situations, the system 5 may have more than one gateway 22. These multiple gateways can be used to improve the effective throughput and reliability of the network by providing additional bandwidth for the communication between the wireless HART network and the plant automation network 12 or the outside world. On the other hand, the gateway 22 device may request bandwidth from the appropriate network service according to the gateway communication needs within the wireless communication network 14. The gateway 22 may further reassess the necessary bandwidth while the system is operational. For example, the gateway 22 may receive a request from a host residing outside the wireless communication network 14 to retrieve a large amount of data. The gateway device 22 may then request additional bandwidth from a dedicated service such as a network manager in order to accommodate this transaction. The gateway 22 may then request the release of the unnecessary bandwidth upon completion of the transaction.

In some embodiments, the gateway 22 is functionally divided into a virtual gateway 24 and one or more network access points 25. Network access points 25 may be separate physical devices in wired communication with the gateway 22 in order to increase the bandwidth and the overall reliability of the wireless communication network 14. However, while FIG. 1 illustrates a wired connection 26 between the physically separate gateway 22 and access points 25, it will be understood that the elements 22-26 may also be provided as an integral device, and/or the connection 26 may be a wireless connection. Because network access points 25 may be physically separate from the gateway device 22, the access points 25 may be strategically placed in several distinct locations. In addition to increasing the bandwidth, multiple access points 25 can increase the overall reliability of the network by compensating for a potentially poor signal quality at one access point at one or more other access points. Having multiple access points 25 also provides redundancy in case of failure at one or more of the access points 25.

The gateway device 22 may additionally contain a network manager software module 27 and a security manager software module 28. In another embodiment, the network manager 27 and/or the security manager 28 may run on one of the hosts on the plant automation network 12. For example, the network manager 27 may run on the host 16 and the security manager 28 may run on the host 18. The network manager 27 may be responsible for configuration of the network, scheduling communication between wireless HART devices (i.e., configuring superframes), management of the routing tables and monitoring and reporting the health of the wireless communication network 14. While redundant network managers 27 are supported, it is contemplated that in an exemplary embodiment, there may be only one active network manager 27 per wireless communication network 14.

Referring again to FIG. 1, the wireless communication network 14 may include one or more field devices 30-40. In general, process control systems, like those used in chemical, petroleum or other process plants, include such field devices 30-40. Each of the field devices 30-40 may be, for example, a valve, a valve positioner, a switch, a sensor (e.g., temperature, pressure or flow rate sensor), a pump, a fan, etc. Field devices perform control and/or physical functions within a process or process control loop such as opening or closing valves and taking measurements of process parameters. In the wireless communication network 14, field devices 30-40 are producers and consumers of wireless communication packets, such as wireless HART packets.

An asset tracking host 41 may be connected to a network 43 which, in turn, may be connected to the plant automation network 12 via a router 44, in the embodiment shown in FIG. 1. The network 43 may be, for example, a public network such as the World Wide Web (WWW), a private network such as a private LAN, or some combination of one or more private and public networks. In some embodiments, access to the asset tracking host 41 may be gained through the network 43 via a web service. The asset tracking host 41 itself may include one or more computing devices such a server, a set of computing devices that are linked via in a peer-to-peer network, a set of computing devices linked via a cloud computing network, or a set of computing devices linked in another manner so that the asset tracking host 41 appears to the networks 12, 14 as a virtual single, addressable computing device. In FIG. 1, the asset tracking host 41 is illustrated as not belonging to either the plant automation network 12 or to the wireless communication network 14, but instead accesses devices on both networks 12, 14 via the router 44.

In other embodiments, however, the asset tracking host 41 may be the asset tracking host 41 belong to the plant automation network 12 or to the wireless communication network 14. In these embodiments, the network 43 and the router 44 may be omitted. For example, the asset tracking host 41 may be directly connected to the backbone 20, or the asset tracking host may be included in one or more of the workstations 16. In another example, the asset tracking host 41 may be a node of the wireless communication network 14. The asset tracking host 41 may be configured to track assets of the process control environment, and is described in more detail in a subsequent section.

The wireless communication network 14 may use a wireless industrial automation protocol which provides similar operational performance that is experienced with wired devices. The applications of this protocol may include process data monitoring, critical data monitoring (with the more stringent performance requirements), calibration, device status and diagnostic monitoring, field device troubleshooting, commissioning, and supervisory process control. These applications require that the wireless communication network 14 use a protocol which can provide fast updates when necessary, move large amounts of data when required, and support network devices which join the wireless communication network 14 only temporarily for commissioning and maintenance work.

In one embodiment, the wireless protocol supporting network devices of the wireless communication network 14 is an extension of the HART industrial automation protocol, a widely accepted industry standard, that maintains the simple workflow and practices of the wired environment, and that includes messages defined specifically for communicating (e.g., transmitting and/or receiving) data related to controlling or monitoring process variables. In accordance with this embodiment, the same tools used for wired HART devices may be easily adapted to wireless devices with the simple addition of new device description files. In this manner, the wireless HART protocol leverages the experience and knowledge gained using HART to minimize training and simplify maintenance and support. Generally speaking, it may be convenient to adapt a protocol for wireless use so that most applications running on a device do not "notice" the transition from a wired network to a wireless network. Clearly, such transparency greatly reduces the cost of upgrading networks and, more generally, developing and supporting devices that may be used with such networks.

Referring again to FIG. 1, field devices 30-36 may be wireless HART devices. In other words, a field device 30, 32, 34, or 36 may be provided as an integral unit supporting all layers of the wireless HART protocol stack. In the network 10, the field device 30 may be a wireless HART flow meter, the field devices 32 may be wireless HART pressure sensors, the field device 34 may be a wireless HART valve positioner, and the field device 36 may be a wireless HART vibration sensor. Importantly, wireless HART devices 30-36 are HART devices supporting all that users have come to expect from the wired HART protocol. As one of ordinary skill in the art will appreciate, one of the core strengths of the HART protocol is its rigorous interoperability requirements. In some embodiments, all wireless HART equipment includes core mandatory capabilities in order to allow equivalent device types to be exchanged without compromising system operation. Furthermore, the wireless HART protocol is backward compatible to HART core technology such as the device description language (DDL). In the preferred embodiment, all HART devices should support the DDL, which ensures that end users immediately have the tools to begin utilizing the wireless HART protocol.

On the other hand, a field device 38 may be a legacy 4-20 mA device and a field device 40 may be a wired HART device. Field devices 38 and 40 may be connected to the wireless HART network 13 via a wireless HART adaptor (WHA) 50. Additionally, the WHA 50 may support other communication protocols such as Foundation Fieldbus, PROFIBUS, DeviceNet, etc. In these embodiments, the WHA 50 supports protocol translation on a lower layer of the protocol stack. Additionally, it is contemplated that a single WHA 50 may also function as a multiplexer and may support multiple HART or non-HART devices.

Plant personnel may additionally use handheld or portable communication devices for installation, control, monitoring, and maintenance of network devices and other plant equipment. Generally speaking, handheld devices are portable equipment that may be able to connect directly to the wireless communication network 14 or through the gateway 22 as a host on the plant automation network 12. As illustrated in FIG. 1, a wireless HART-connected handheld device 55 communicates directly to the wireless communication network 14. When operating with a formed wireless communication network 14, this device 55 may join the network 14 as just another wireless HART field device. When operating with a target network device that is not connected to a wireless HART network, the handheld device 55 may operate as a combination of the gateway device 22 and the network manager 27 by forming its own wireless HART network with the target network device.

In some embodiments, a plant automation network-connected handheld device (e.g., the device 55) may not be a node of the network 14, but instead may communicate or connect to the plant automation network 12 instead by using a known networking or general purpose communication protocol, such as Wi-Fi™, Bluetooth®, or some other standardized or standard-based communication protocol (not shown). The device 55 may talk to the network devices 30-40 through the gateway device 22 in the same fashion as external plant automation servers (not shown) or the workstations 16 and 18. An example of such a handheld device is described in U.S. patent application Ser. No. 12/755,169, filed Apr. 6, 2010 and entitled "Methods and Apparatus to Communicatively Couple a Portable Device to Process Control Devices in a Process Control System," the entire disclosure of which is hereby expressly incorporated herein by reference.

Additionally, the wireless communication network 14 may include a router device 60. The router device 60 is a network device that forwards packets from one network device to another. A network device that is acting as a router device uses internal routing tables to decide to which network device it should forward a particular packet. Standalone routers such as the router 60 may not be required in those embodiments where all devices on the wireless communication network 14 support routing. However, it may be beneficial (e.g. to extend the network, or to save the power of a field device in the network) to add a dedicated router 60 to the network.

All devices directly connected to the wireless communication network 14 may be referred to as network devices, or nodes of the wireless communication network 14. In particular, the wireless HART field devices 30-36, the adaptors 50, the routers 60, the gateway 22, the access points 25, and the wireless HART-connected handheld device 55 are, for the purposes of routing and scheduling, the network devices or the nodes of the wireless communication network 14. In order to provide a very robust and an easily expandable network, it is contemplated that all network devices may support routing and each network device may be globally identified by its HART address. The network manager 27 may contain a complete list of network devices and assign each device a short, network unique 16-bit nickname. Additionally, each network device may store information related to update rates, connections sessions, and device resources. In short, each network device maintains up-to-date information related to routing and scheduling. The network manager 27 communicates this information to network devices whenever new devices join the network or whenever the network manager detects or originates a change in topology or scheduling of the wireless communication network 14.

Further, each network device may store and maintain a list of neighbor devices that the network device has identified during the listening operations. Generally speaking, a neighbor of a network device is another network device of any type potentially capable of establishing a connection with the network device in accordance with the standards imposed by a corresponding network. In case of the wireless communication network 14, the connection is a wireless connection. However, it will be appreciated that a neighboring device may also be a network device connected to the particular device in a wired manner. As will be discussed later, network devices promote their discovery by other network devices through advertisement, or special messages sent out during the designated timeslots. Network devices operatively connected to the wireless communication network 14 have one or more neighbors which they may choose according to the strength of the advertising signal or to some other principle. Referring again to FIG. 1, in a pair of network devices connected by a direct wireless connection 65, each device recognizes the other as a neighbor. Thus, network devices of the wireless communication network 14 may form a large number of connections 65. The possibility and desirability of establishing a direct wireless connection 65 between two network devices is determined by several factors such as the physical distance between the nodes, obstacles between the nodes, signal strength at each of the two nodes, etc. Further, two or more direct wireless connections 65 may form paths between nodes that cannot form a direct wireless connection 65. For example, the direct wireless connection 65 between the wireless HART handheld device 55 and wireless HART device 36 along with the second direct wireless connection 65 between the wireless HART device 36 the router 60 form a communication path between devices 55 and 60.

Figure 2:
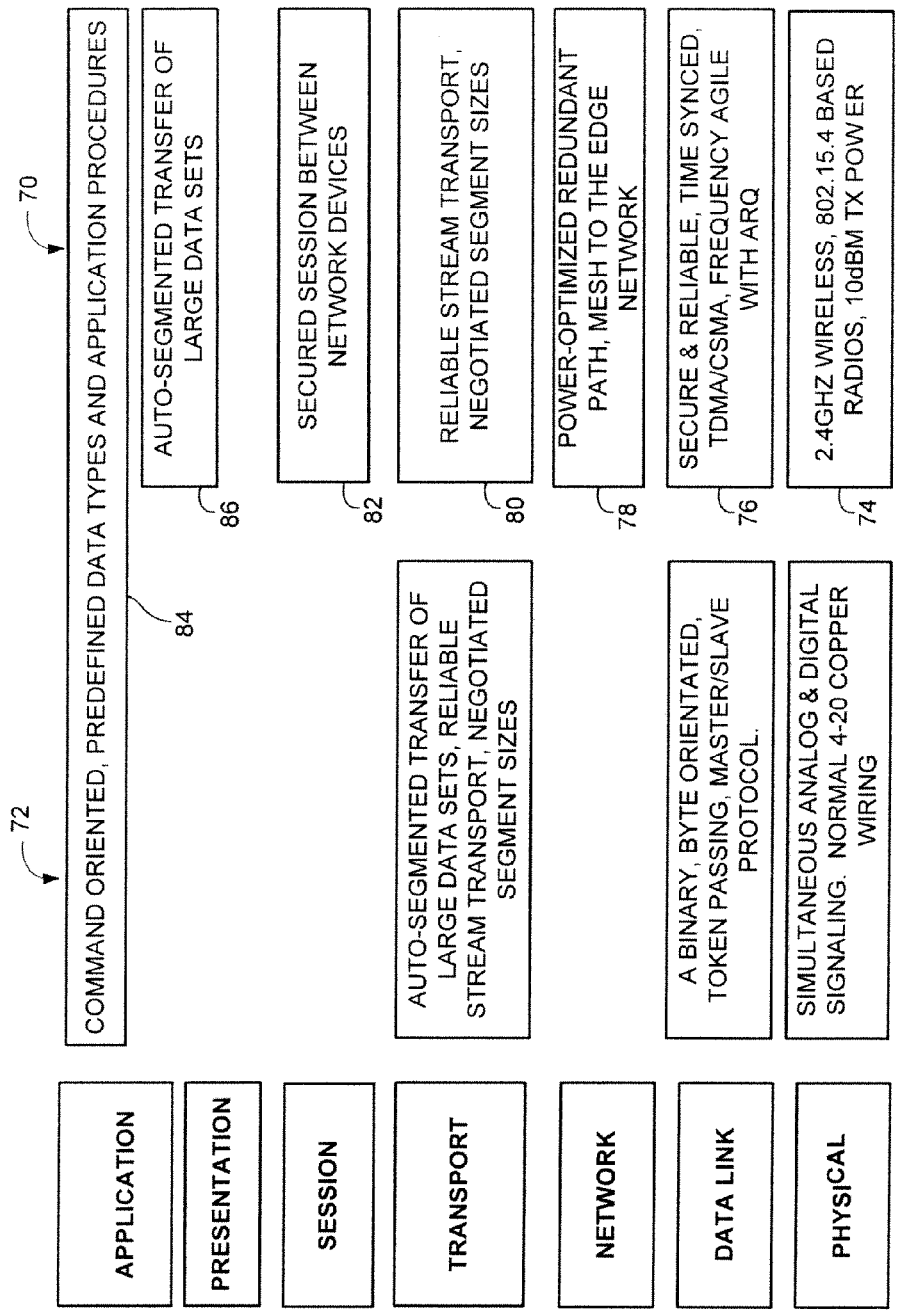
FIG. 2 is a schematic representation of possible layers of a wireless HART protocol implemented in accordance with one of the embodiments discussed herein.

In one embodiment, the protocol supporting the wireless communication network 14 is a wireless HART protocol 70. More specifically, each of the direct wireless connections 65 may transfer data according to the physical and logical requirements of the wireless HART protocol 70. FIG. 2 schematically illustrates the structure of one of the embodiments of the protocol 70 and of the existing "wired" HART protocol 72. The wireless HART protocol 70 may be a secure, wireless mesh networking technology operating in the 2.4 GHz ISM radio band (block 74). In one embodiment, the wireless HART protocol 70 may utilize IEEE 802.15.4 compatible direct sequence spread spectrum (DSSS) radios with channel hopping on a transaction by transaction basis. This wireless HART communication may be arbitrated using time division multiple access or Time Division Multiple Access (TDMA) to schedule link activity (block 76). All communications are preferably performed within a designated time slot. One or more source and one or more destination devices may be scheduled to communicate in a given slot, and each slot may be dedicated to communicate from a single source device or to a CSMA/CA (Carrier Sense Multiple Access with Collision Avoidance)-like shared communication access mode between multiple source devices. Source devices may send messages to a specific target device or broadcast messages to all of the destination devices assigned to the slot.

To enhance reliability, the wireless HART protocol 70 may combine TDMA with a method of associating multiple radio frequencies with a single communication resource, or channel hopping. Channel hopping provides frequency diversity which minimizes interference and reduces multi-path fading effects. In particular, the data link 76 may create an association between a single superframe and multiple carrier frequencies which the data link 76 cycles through in a controlled predefined manner. For example, the available frequency band of a particular instance of the wireless communication network 14 may have carrier frequencies $F_1$, $F_2$, . . . $F_n$. A relative frame R of a superframe S may be scheduled to occur at a frequency $F_1$ in the cycle $C_n$, at a frequency $F_5$ in the following cycle $C_{n+1}$, at a frequency $F_2$ in the cycle $C_{n+2}$, and so on. The network manager 27 may configure the relevant network devices with this information so that the network devices communicating in the superframe S may adjust the frequency of transmission or reception according to the current cycle of the superframe S.

In one embodiment, the network manager 27 is responsible for allocating, assigning, and adjusting time slot resources associated with the data link layer 76. If a single instance of the network manager 27 supports multiple wireless HART networks 14, the network manager 27 may create an overall schedule for each instance of the wireless communication network 14. The schedule may be organized into superframes containing time slots numbered relative to the start of the superframe. Additionally, the network manager 27 may maintain a global absolute slot count which may reflect the total of number of time slots scheduled since the start-up of the wireless communication network 14. This absolute slot count may be used for synchronization purposes.

The wireless HART protocol 70 may further define links or link objects in order to logically unite scheduling and routing. In particular, a link may be associated with a specific network device, a specific superframe, a relative slot number, one or more link options (transmit, receive, shared, etc.), and a link type (normal, advertising, discovery, join, etc.). As illustrated in FIG. 2, the data link 76 may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

Other layers of the wireless HART protocol 70 are also illustrated in FIG. 2. Both the existing HART protocol 72 and the wireless HART protocol 70 are loosely organized around the well-known ISO/OSI 7-layer model for communications protocols. In the wireless expansion of HART technology, three physical layers and two data-link layers may be supported: the wired and the wireless mesh. Because the wireless HART protocol described herein allows deployment of mesh topologies, a significant network layer 78 may be specified as well.

As indicated above, a superframe may be understood as a collection of time slots repeating in time. The number of slots in a given superframe (superframe size) determines how often each slot repeats, thus setting a communication schedule for network devices that use the slots. Each superframe may be associated with a certain graph identifier. In some embodiments, the wireless communication network 14 may contain several concurrent superframes of different sizes. Moreover, a superframe may include multiple radio channels, or radio frequencies.

Further, the transport layer 80 of the wireless HART protocol 70 allows efficient, best-effort communication and reliable, end-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis.

In contrast, reliable communications allow devices to send acknowledgement packets. In addition to guaranteeing data delivery, the transport layer 80 may order packets sent between network devices. This approach may be preferable for a request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the wireless communication network 14 to activate a new superframe. Alternatively, a field device such as the sensor 30 may generate a packet and propagate the request to another field device such as the portable HART communicator 55. As another example, an alarm or event generated by the 34 field device may be transmitted as a request directed to the gateway 22. In response to successfully receiving this request, the gateway 22 may generate a response packet and send it to the device 34 acknowledging receipt of the alarm notification.

Referring again to FIG. 2, the session layer 82 may provide session-based communications between network devices. End-to-end communications may be managed on the network layer by sessions. A network device may have more than one session defined for a given peer network device. It is contemplated that in some embodiments, almost all network devices may have at least two sessions established with the network manager 27: one for pair-wise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Finally, both the wireless HART protocol 70 and the wired HART protocol 72 may support a common HART application layer 84. The application layer of the wireless HART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

Figure 3:
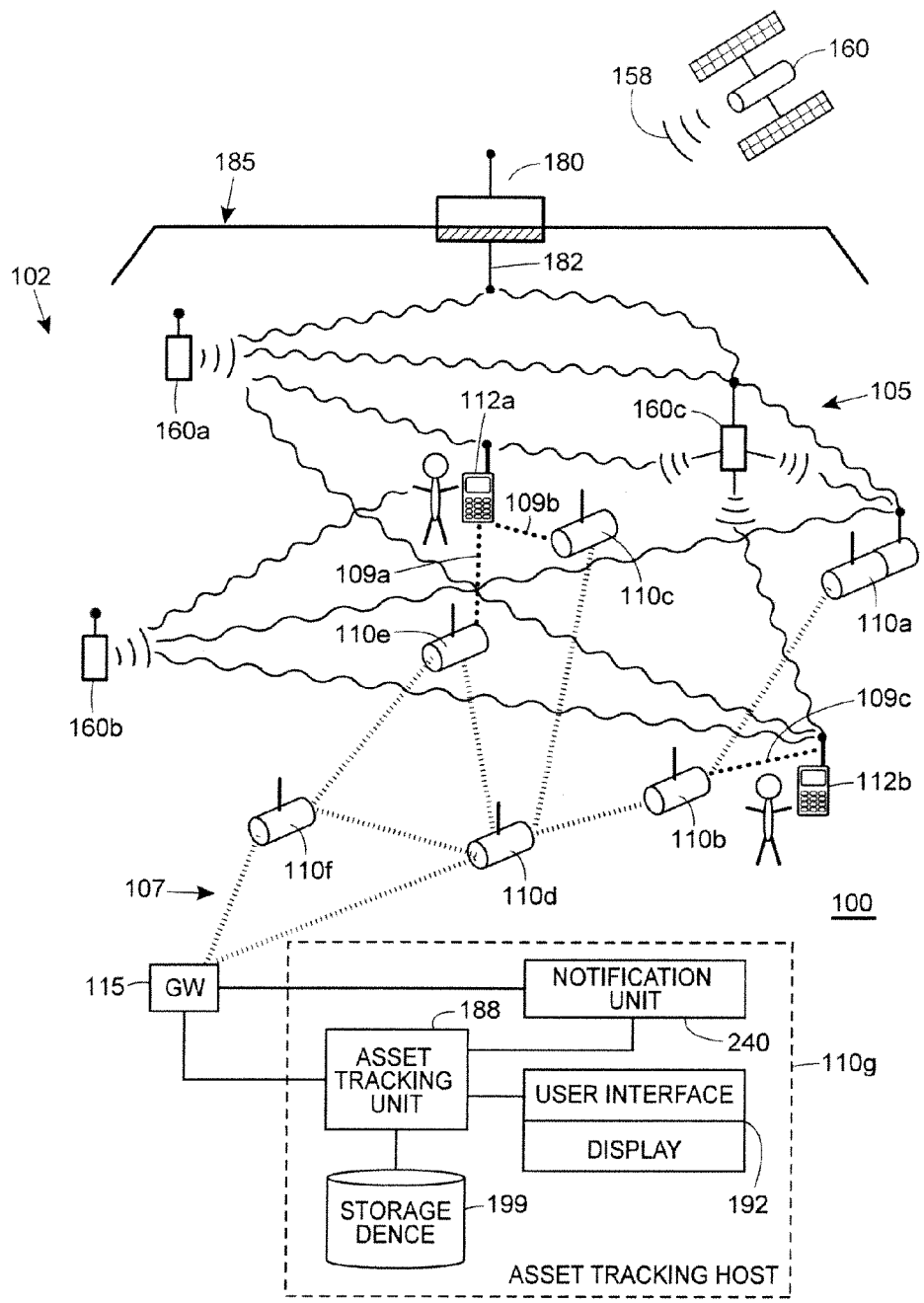
FIG. 3 is an embodiment of an asset tracking system.

FIG. 3 illustrates an exemplary asset tracking system 100 that may be used with the system 5 of FIG. 1. For example, the asset tracking system 100 may be used in a process control environment 102 that is included in the system 5 of FIG. 1.

The asset tracking system 100 may include a geo-positioning radiating system 105 (denoted in FIG. 3 by the wavy lines, e.g., a system that uses GPS (Global Positioning System) or other geo-positioning technology, or other positioning technology such as that produced by Time Domain® systems), and one or more communication networks 107 (denoted in FIG. 3 by the hatched lines). The subsystems 105 and 107 of the asset tracking system 100 are described in more detail below.

The one or more communication networks 107 of the asset tracking system 100 may be, in an embodiment, the communication network 10 of FIG. 1. For example, the one or more communication networks 107 may include one or more plant automation networks that are substantially wired, such as the plant automation network 12 of FIG. 1. The one or more communication networks may additionally or alternatively include one or more wireless plant automation networks, such as the wireless plant automation network 14 of FIG. 1. In some embodiments, more than one wireless network 107 may be included in the process control environment 102, and/or more than one plant automation network 12 may be included in the process control environment 102. In FIG. 3, for clarity, but not as limitation, the process control environment 102 is shown as including a wireless plant automation network 107 while a wired portion of the network is omitted.

In an embodiment, devices 110a-110f may be connected to the wireless network 107. That is, the devices 110a-110f may be nodes of the network 107 and may communicate across the wireless network 107 by using an industrial automation protocol, such as the wireless HART protocol. The industrial automation protocol may include one or more messages that are defined specifically to communicate process data between the devices 110a-110f and other nodes on the network 107, such as previously discussed.

The process data communicated via the industrial automation protocol may correspond to one or more control loops executing in the process control environment 102. In an embodiment, at least one of the devices 110a-110f may be a field device that may perform a function corresponding to at least one of the control loops, and, accordingly, may send or receive process data corresponding to its respective control loop(s). For example, the field device 110b may monitor and/or control a process variable used in a particular control loop. As such, the field device 110b may generate periodic update data corresponding to the process variable, in an embodiment. The field device 110b may generate alarm data to report an abnormal condition encountered by the field device 110b, in an embodiment. In some cases, the field device 110b may perform one or more physical functions corresponding to the process variable and/or corresponding to the particular control loop, such as adjusting a valve, taking a measurement, or sending a signal. The field devices 110a-110f may correspond to the field devices 30-40 described with respect to FIG. 1, in an embodiment.

One or more portable communication devices 112a, 112b may communicate via communication links 109a-109c (denoted in FIG. 3 by the dotted lines) with the wireless network 107, in a manner such as previously discussed for device 55 of FIG. 1. In some embodiments, one or more of the links 109a-109c may be a wireless communication link, and the one or more of the portable communication devices 112a, 112b may communicate with the wireless network 107 using a wireless industrial automation protocol (e.g., wireless HART) over the wireless communication link. In these embodiments, the one or more of the portable communications devices (e.g., the device 112a or 112b) may be a respective node in the communication network 107, and thus may communicate with a node of the wireless network 107 (e.g., the node 110c, 110e or 110b) by using a wireless HART compliant radio. In some embodiments, one or more of the portable communication devices 112a, 112b may communicate with a node of the wireless network 107 (e.g., the node 110c, 110e or 110b) by using a standard, general purpose wireless communication protocol (e.g., Wi-Fi, Bluetooth, etc.) over the wireless communication link.

In some embodiments, one or more the links 109a-109c may be a wired communication link that is a physical, tangible link (e.g., a USB (Universal Serial Bus) connection, a cable, etc.) A portable communication device 112a, 112b that is physically connected with the physical, tangible link 109a-109c may communicate with a node in the wireless network 107 using a protocol suited for the physical connection, such as an Ethernet protocol or a wired HART protocol over FSK (Frequent Shift Keying).

In the asset tracking system 100, at least one of the devices coupled to the network 107 may be the asset tracking host 41 shown in FIG. 1. In FIG. 3, the device 110g is depicted as an embodiment of the asset tracking host 41. The asset tracking host 110g maybe coupled to the network 107 through a gateway 115, in an embodiment. The gateway 115 may be, for example, the gateway 22 shown in FIG. 1. In some embodiments, the asset tracking host 110g may be incorporated into the same computing device(s) or physical entity (or entities) as the gateway 22. In other embodiments (not shown), the asset tracking host 110g may be directly coupled to the network 107 and, in fact, may operate as a node of the network 107.

In the asset tracking system 100, at least one of the field devices 110a-110f and/or at least one of the portable communication devices 112a, 112b may include an asset tracking device. Example block diagrams of possible embodiments of asset tracking devices 120a and 120b are illustrated in FIGS. 4A and 4B, respectively.

Figure 4A:
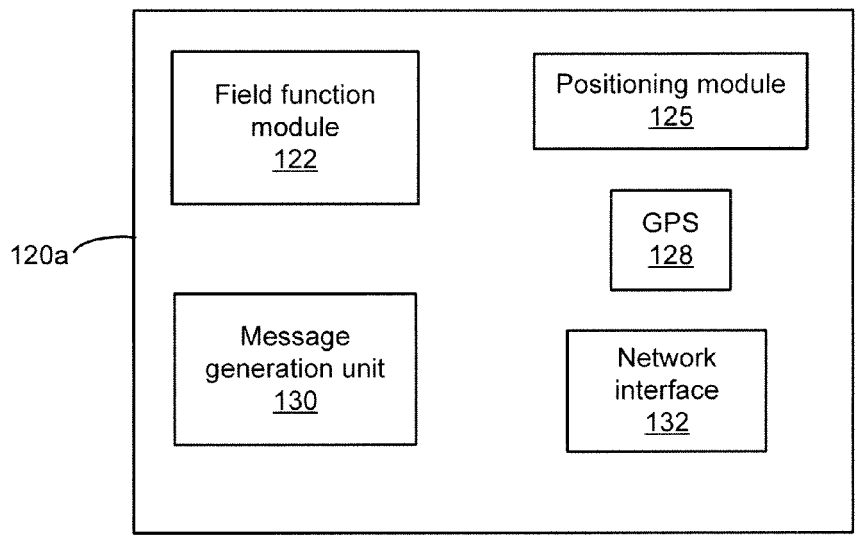
FIG. 4A is a block diagram of an embodiment of an asset tracking device.
Figure 4B:
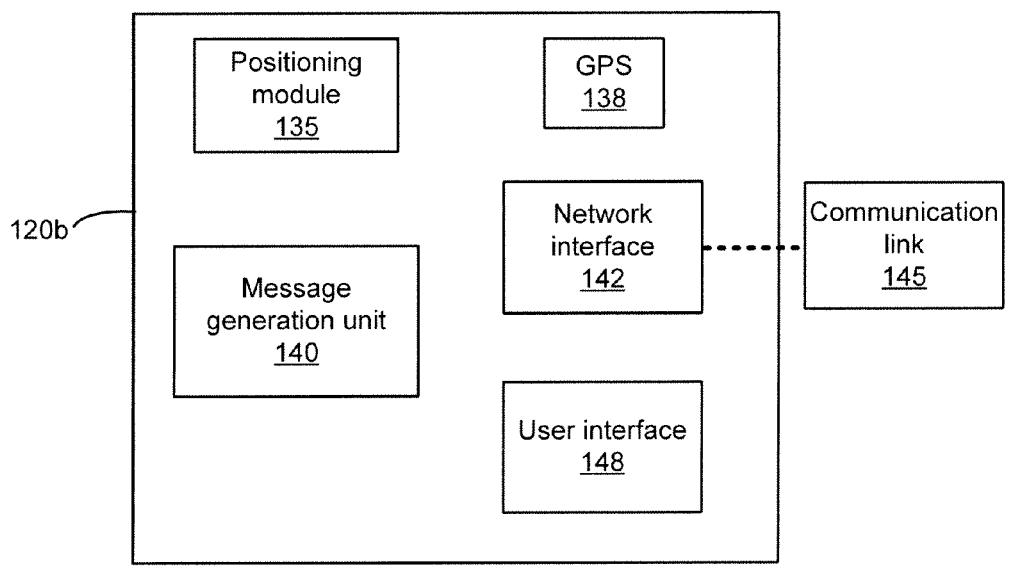
FIG. 4B is a block diagram of another embodiment of an asset tracking device.

The embodiment of the asset tracking device 120a illustrated in FIG. 4A may be co-located with or included in a field device, such one of the field devices 110a-110f. The asset tracking device 120a may include a field function module 122 configured to perform process control functions. For example, the field function module 122 may be configured to perform at least one of monitoring or controlling a process variable, and/or may be configured to perform one or more physical functions (e.g., change a valve position, take a measurement, send a signal, etc.) based on the process variable and/or based on one or more control loops associated with the process variable.

The asset tracking device 120a may include a positioning module 125 that is configured to receive positioning data corresponding to an asset or asset tracking device 120a and determine a spatial position or a spatial location of the asset or asset tracking device 120a indicated by the positioning data. In an embodiment, at least a portion of the positioning module 125 may include computer-executable instructions stored on a memory of the asset tracking device 120a and executable by a processor of the asset tracking device 120a. The positioning module 125 may be in communicative connection with a GPS receiver 128 that receives one or more GPS signals originated by one or more GPS satellites, and communicates indications of the GPS signals to the positioning module 125. The positioning module 125 may determine a spatial position (e.g., a geographical position or a position corresponding to a set of three-dimensional coordinates) of the asset tracking device 120a based on the GPS signals by using triangulation, mapping, and/or another suitable technique. Although FIG. 4A illustrates the asset tracking device 120a as including a receiver of GPS technology (reference 128), in other embodiments, the asset tracking device 120a may omit the GPS receiver 128 and instead include a spatial positioning receiver or device that utilizes another geo-positioning technology other than GPS. Indeed, the asset tracking device 120a may include a receiver or device of any suitable technology for determining spatial coordinates or geo-spatial positions.

The asset tracking device 120a may include a message generation unit 130 that is configured to generate a message conforming to the industrial automation protocol, and to generate a position indication field in the message. The message generation unit 130 may populate the position indication field based on the spatial position or location determined by the positioning module 125. For example, the message generation unit 130 may populate the position indication field with at least a portion of the positioning data obtained by the positioning module 125. In an embodiment, at least a portion of the message generation unit 130 may include computer-executable instructions stored on a memory of the asset tracking device 120a and executable by a processor of the asset tracking device 120a. In addition to the position indication field, the industrial automation protocol message may also include an indication of an asset that is desired to be tracked or an indication of the asset tracking device 120a. The message may include, as a destination of the message, an indication of the asset tracking host 110g. In some embodiments, the position indication field, the indication of the asset or the asset tracking device identification, and/or the indication of the asset tracking host may be included in one or more user-defined fields of the industrial automation protocol message. The position indication field, the indication of the asset or the asset tracking device 120b, and/or the indication of the asset tracking host 110g may be included at the application and/or presentation layer 86 of the industrial automation protocol message, in some embodiments. The message generation unit 130 may cause generated messages to be transmitted to the asset tracking host 110g using the industrial automation protocol via a network interface 132 and the network 107. In some embodiments, in addition to generating messages destined for the asset tracking host 110g, the message generation unit 130 may also generate other industrial automation protocol messages and cause them to be transmitted to other nodes in the communication network 10, e.g., messages for transmitting data related to controlling or monitoring process variables (e.g., process data provided by the field function module 122).

The network interface 132 may be included in the asset tracking device 120a, in an embodiment. The network interface 132 may be a wireless interface, a wired interface, or some combination of wired and wireless interfaces. In one embodiment, the network interface 132 may be a wireless HART compliant radio. As the asset tracking device 120a may be included in a field device 110a-110f that is communicatively coupled to the network 107, the network interface 132 may, via the network 107, communicate messages to and from the field device 110a-110f. Accordingly, the network interface 132 may communicate messages to and from the asset tracking device 120a that is co-located with or included in the field device 110a-110f. In particular, the network interface 132 may deliver messages generated by the message generation unit 130 to the network 107.

While FIG. 4A depicts an embodiment of an asset tracking device 120a that is co-located with or included in a field device 110a-110f, FIG. 4B depicts an embodiment of an asset tracking device 120b that is co-located with or included in a portable communications or computing device, such as device 112a or 112b of FIG. 3. In particular, the asset tracking device 120b may be a separate entity (e.g., physically separate) from any of the field devices 110-110f, but may be communicatively coupled to one or more field devices 110a-110f. In some embodiments, the asset tracking device 120b may be included in a communications or computing device such as a tablet or laptop computer, a smart phone or device, a two-way radio, a paging unit, or some other type of device that includes a memory, executable instructions stored on the memory, and a processor configured to execute the stored instructions.

The asset tracking device 120b may include a positioning module 135. In an embodiment, at least a portion of the positioning module 135 may include computer-executable instructions stored on a memory of the asset tracking device 120b that, when executed by the processor of the asset tracking device 120b, may receive positioning data corresponding to an asset or asset tracking device 120b, and determine a spatial position of the asset or asset tracking device 120b indicated by the positioning data, in an embodiment. In the embodiment 120b shown in FIG. 4B, the positioning module 135 may be communicatively coupled to a GPS receiver 138 that receives one or more GPS signals originated by one or more GPS satellites, and communicates indications of the GPS signals to the positioning module 135. Based on the GPS signals, the positioning module 135 may determine a spatial position (e.g., a geographical position or a position corresponding to a set of three-dimensional coordinates) of the asset tracking device 120b by using triangulation, mapping, and/or another suitable technique, in an embodiment. Although FIG. 4B illustrates the receiver 138 as utilizing GPS technology, in other embodiments, the asset tracking device 120b may omit the GPS receiver 138 and instead include a spatial positioning receiver or device utilizing another suitable geo-positioning technology. Indeed, the asset tracking device 120b may include a receiver or device of any suitable technology for determining spatial coordinates or geo-spatial positions.

The asset tracking device 120b may include a message generation unit 140. In an embodiment, at least a portion of the message generation unit 140 may include computer-executable instructions stored on the memory of the asset tracking device 120b that, when executed by the processor of the asset tracking device 120b, may generate a message conforming to the industrial automation protocol, and may generate a position indication field in the message. The message generation unit 140 may populate the position indication field based on the spatial position or location determined by the positioning module 135. For example, the message generation unit 130 may populate the position indication field with at least a portion of the positioning data obtained by the positioning module 135. In addition to the position indication field, the industrial automation protocol message may also include an indication of the identification of an asset that is desired to be tracked. In some cases, the asset may correspond to the asset tracking device 120b. In some cases, the asset may be a device, location or other entity within the process control environment 102 that is proximate to the asset tracking device 120b, for instance, when a person holds the portable asset tracking device 120b near to an asset that is desired to be tracked. The message may include, as a destination of the message, an indication of the asset tracking host 110g. In some embodiments, the position indication field, the indication of the asset tracking device 120b, and/or the indication of the asset tracking host 110g may be included in one or more user-defined fields of the industrial automation protocol message. The position indication field, the indication of the asset tracking device identification, and/or the indication of the asset tracking host may be included at the application and/or presentation layer 86 of the industrial automation protocol message, in some embodiments. The message generation unit 140 may cause generated messages to be transmitted to the asset tracking host 110g using the industrial automation protocol via a network interface 142 and the network 107.

The network interface 142 may be included in the asset tracking device 120b. In some embodiments, the network interface 142 of the asset tracking device 120b may be a wireless interface, such as Wi-Fi, Bluetooth, or a Wireless HART compliant radio. Specifically, the network interface 142 may deliver messages generated by the message generation unit 140 via a communication link 145 to the network 107, in a manner such as previously described with respect to devices 112a and 112b of FIG. 3. Typically, the communication link 145 may be a wireless communication link. In some embodiments, however, the communication link 145 may be a wired communications link, such as a USB (Universal Serial bus) or some other physical, tangible connection. In some embodiments, the communication link 145 may be one of the links 109a-109c shown in FIG. 3.

In some embodiments, the asset tracking device 120b may include a user interface 148. The user interface 148 may include, for example, an input device having a keypad or buttons, a touch screen, or some other suitable user input interface for receiving information from a user. The user interface 148 may include, for example, an output device such as a screen, a display, or some other suitable user output interface for presenting information. In an embodiment, a user of the asset tracking device 120b may enter data or information via the user interface 148, and the entered data or information may be transmitted in conjunction with the spatial position indication to the asset tracking host 110g. For example, the data or information may include environmental data or environmental information, such as a local measurement of a gas or other substance. In another example, the data or information may include comments or a note provided by the operator, e.g., "No leaks seen in pipeline." Other data or information may be alternatively or additionally transmitted, in conjunction with the spatial positioning information, by the asset tracking device 120b to the asset tracking host 110g.

In some embodiments, rather than using the user interface 148 to obtain environmental and/or other information, the environmental and/or other information may be obtained by the asset tracking device 120b via a download or data transfer from another device (not shown), such as via the network interface 142 of the device 120b or via some other inter-device interface. In these embodiments, the asset tracking device 120b may forward the environmental and/or other information along with the spatial positioning information to the asset tracking host 110b via the network interface 142, the communication link 145, and the network 107 using one or more industrial automation protocol messages.

Figure 5:
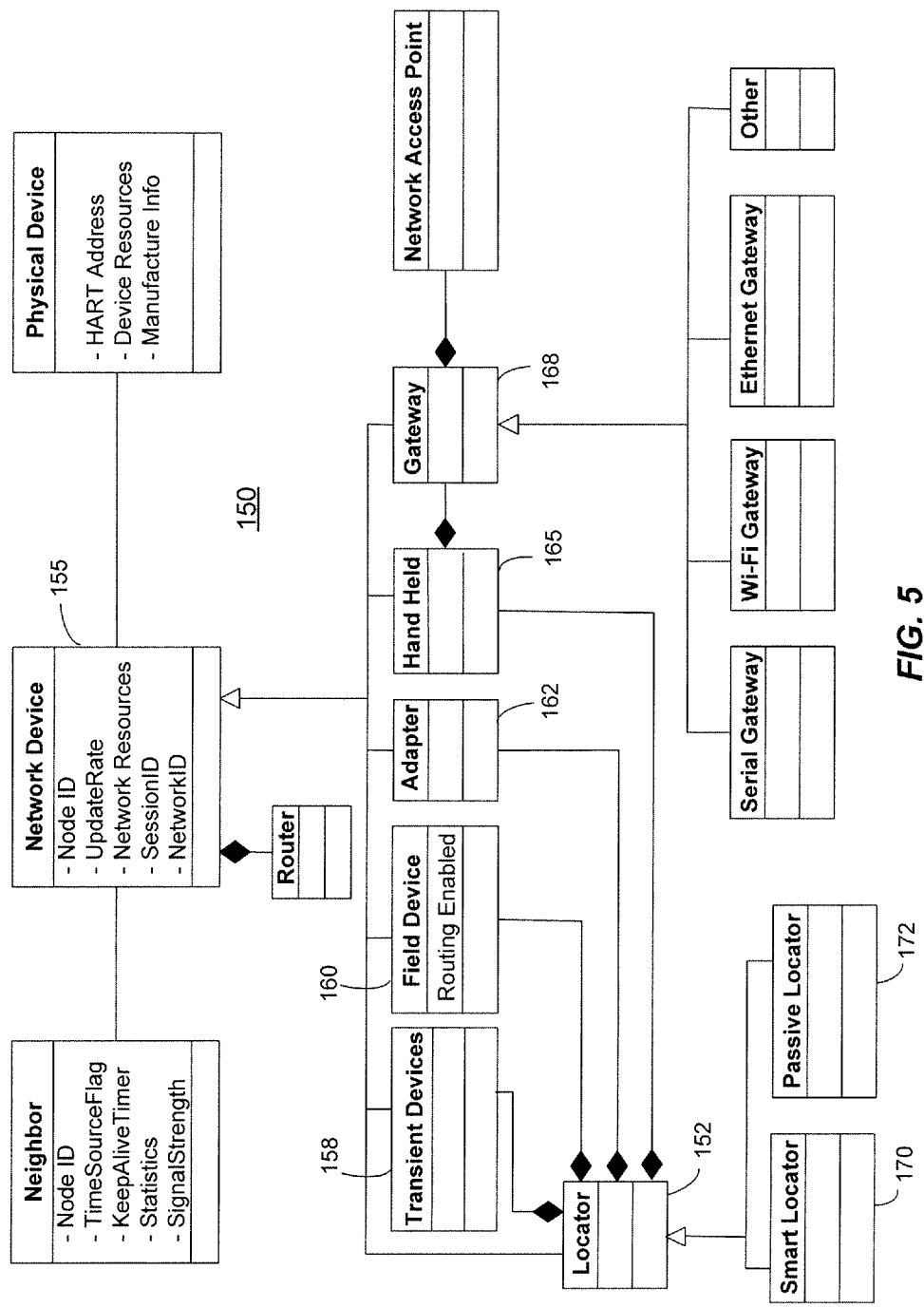
FIG. 5 is an exemplary schema of device types that may be configurable in a process control environment.

In some embodiments of the process control environment 102, the asset tracking devices 120a, 120b may be modeled so that the devices 120a, 120b may be configured by a configuration application of the process control environment 102. For example, a configuration environment of the process plant may include an object used in an object oriented programming schema to indicate that the asset tracking devices 120a, 120b have locating or tracking capabilities. As used herein, said object is termed a "locator," although any suitable designation may be used. FIG. 5 illustrates an embodiment of a schema 150 that extends device models in a configuration environment of a process control environment 102 to include an object or template 152 corresponding to locators. The schema 150 may include, for example, a network device object or template 155 that may include parameters such as an identification of a node, an update rate, a session identification, a network identification, etc.

As understood by those skilled in the art, a network device corresponding to the network device object may be a transient device, a field device, an adapter, a hand-held or portable device or a gateway device. Thus, the network device model 155 may be extended to include the respective device type models 158-168. Each of the transient device model 158, the field device model 160, the adapter model 162, the hand-held or portable device model 165, or the gateway device model 168 may be itself extended to include a locator 152, thus providing the ability for a transient device, a field device, an adapter, a hand-held or portable device or a gateway device to be configured as an asset tracking device. In some embodiments, not all device models 158-168 may be extended to include the locator object 152. In some embodiments, another device model other than the models 158-168 may be extended to include the locator object 152. In some embodiments, models other than those corresponding to devices may be extended to include the locator object 152.

The locator model or object 152 may itself be extended to include a smart locator object 170 or a passive locator object 172, thus providing the ability of an asset tracking device to be configured as a smart locator or as a passive locator. A smart locator may be, for example, an asset tracking device that is configured to determine a relative spatial position from an absolute spatial position, and communicate the relative spatial position to an asset tracking host, such as asset tracking host 110g. A passive locator may be, for example, an asset tracking device that receives signals indicating an absolute spatial position (e.g., GPS signals), and forwards the received signals to the asset tracking host 110g without any further processing of the received signals. As used herein, a "relative spatial position" or a "relative spatial location" may be a spatial position that is defined in terms of a known landmark, waypoint, or other point of reference. As used herein, an "absolute spatial position" or an "absolute spatial location" may be a spatial position that is defined in terms of an exact location in space, e.g., a set of three-dimensional coordinates; a latitude, longitude, and altitude intersection; etc.

Turning back to FIG. 3, the asset tracking system 100 may include a geo-positioning radiating system 105. Although in FIG. 3, the geo-positioning radiating system 105 is depicted as a GPS radiating system, the geo-positioning radiating system 105 may utilize any suitable geo-positioning technology. The GPS radiating system 105 may include one or more external antennas 180 that are disposed or located external to the process control environment 102, e.g., on an exterior face of a roof or ceiling 185, or at some location at a higher altitude than other equipment of the process control environment so that signals received by the external antenna(s) 180 are minimally obstructed by the process control environment 102, if at all. In FIG. 3, for clarity, but not as a limitation, the process control environment 102 is illustrated as being covered or vertically bounded by the one or more roofs or ceilings 185 supporting the one or more external antennas 180, although it is understood that the external antenna(s) 180 (and, indeed, the GPS radiating system 105) may be used in conjunction with process control environments that are only partially covered by one or more roofs or ceilings, or with process control environments that do not have roofs or ceilings at all.

In the GPS radiating system 105, the one or more external antennas 180 may receive one or more satellite signals 158 from a set of satellites 160 orbiting the Earth. Optimally, a set of three satellite signals is required to determine a spatial position, although other numbers of satellite signals may be used, such as one signal, two signals, or more than three signals. The external antennas 180 may be connected to one or more initial transmitters 182 that may be disposed or located internally to the process control environment, e.g., on an interior face of the roof or ceiling 185, if such a roof or ceiling is present. The one or more initial transmitters 182 may radiate the original satellite signals 158 received by the antenna(s) 180 to one or more re-radiating antennas 160a-160c disposed at strategic locations throughout the process control environment 102.

The original satellite signals 158 may be amplified, and one or more re-radiating antennas 160a-160c may re-radiate the amplified GPS signals into the process control environment 102. In some embodiments, the initial transmitter(s) 182 may amplify the original satellite signals 158 before transmitting the signals to the re-radiating antennas 160a-160c. In some embodiments, the initial transmitter(s) 182 may transmit the original GPS signals 158 to the one or more re-radiating antennas 160a-160c, and the one or more re-radiating antennas 160a-160c may amplify the original GPS signals 158 before re-radiating the signal into the process control environment 102. In other embodiments, one or more amplifiers (not shown) that are separate and distinct from the initial transmitter 182 and from the re-radiating antennas 160a-160c may amplify the original GPS signals 158.

As shown in FIG. 3, the one or more re-radiating antennas 160a-160c may be disposed or located within the process control environment 102. For example, the one or more internal transmitters 160a-160c may be disposed or located on an interior face of the roof or ceiling 185 of the process control plant or environment 102, if the process control environment is at least partially covered by a roof or ceiling. Roof 158 or no roof, however, the one or more internal antennas 160a-160c may be suitably situated so that the amplified, re-radiated GPS signals are able to be received at a multiplicity of locations within the process control environment 102. Optimally, but not necessarily, the one or more internal antennas 160a-160c may be situated so that an amplified, re-radiated GPS signal may be received at any location within the process control environment 102.

In an embodiment, the amplified, re-radiated GPS signals may be received at an asset tracking device that is co-located or incorporated into a field device, such as the asset tracking device 120a of FIG. 4A. The amplified, re-radiated GPS signals may be received at the GPS receiver 128, and in a manner such as previously discussed, the GPS receiver 128 may provide indications of the amplified, re-radiated GPS signals to the positioning module 125, and the positioning module 125 may determine the spatial position of the asset tracking device 120a. The asset tracking device 120a may communicate, using an industrial automation protocol message, an indication of the spatial position of the asset tracking device 120a to the asset tracking host 110g via the network interface 132 and the network 107.

In an embodiment, the amplified, re-radiated GPS signals may be received at an asset tracking device that is a portable device, such as the asset tracking device 120b of FIG. 4B. The amplified, re-radiated GPS signals may be received at the GPS receiver 138, and, in a manner such as previously discussed, the GPS receiver 138 may provide indications of the amplified, re-radiated GPS signals to the positioning module 135. The positioning module 135 may determine the spatial position of the asset tracking device 120b or of an asset that is proximately located to the asset tracking device 120b. The spatial position, whether absolute or relative, may be determined by the positioning module 135 by using triangulation, mapping, and/or another suitable technique.

The asset tracking device 120b may communicate, via the network interface 142 and the communication link 145, an indication of the spatial position of the asset tracking device 120b to a node in the communication network 107, such as the node 110e, 110c, or 110b. In embodiments where the asset tracking device 120b is itself a node in the network 107, the asset tracking device 120b may communicate to the asset tracking device 120b, via the network interface 142 and the communication link 145, the indication of the spatial position using an industrial automation protocol message. In embodiments where the asset tracking device 120b is not a node in the network 107, the asset tracking device 120b may communicate to a proximate node (e.g., the node 110e, 110c or 110b), via the network interface 142 and the communication link 145, the indication of the spatial position using a protocol suitable for use on the link 145. The proximate node 110e, 110c or 110b may forward the indication of the spatial position to the asset tracking host 110g by using an industrial automation protocol message via the network 107.

In some embodiments, the indication of the spatial position may include an indication of a respective absolute position or location of the asset to be tracked or of the asset tracking device 120b. For example, the indication of the absolute spatial position may be a set of three-dimensional spatial coordinates (e.g., x, y, z coordinates; or longitude, latitude and altitude coordinates). In some embodiments, one or more of the asset tracking devices 120a, 120b may transmit indications of absolute spatial positions (and not relative spatial positions) to the asset tracking host 110g, and the asset tracking host 110g may determine corresponding relative spatial positions based on the indications of the absolute spatial positions. In these embodiments, the one or more asset tracking devices 120a, 120b may be considered to be passive tracking devices as they merely forward absolute spatial position indications.

In some embodiments, the indication of the spatial position transmitted by the asset tracking devices 120a, 120b to the asset tracking host 110g may include an indication of a respective, relative spatial position or location. In these embodiments, the one or more asset tracking devices 120a, 120b may be considered to be active tracking devices as they determine relative spatial position indications from absolute spatial position indications. For example, a process plant or environment may be logically represented as a virtual spatial grid of cubes, each measuring 1 m×1 m×1 m. The asset tracking device 120a, 120b may receive a particular, absolute spatial indication from the GPS receiver 128, 138, and the asset tracking device 120a, 120b may map the particular, absolute spatial indication to a corresponding particular logical cube in the virtual spatial grid. The asset tracking device 120a, 120b may then transmit an indication of the corresponding particular logical cube to the asset tracking host 110g.

In another example of relative spatial position, the asset tracking device 120a, 120b may represent the particular spatial indication received from the GPS receiver 128, 138 as a relative location based on a known landmark, waypoint, or point of reference within the process control environment (e.g., "3.5 m south, 5.25 m west, and 15 meters in elevation above the top of boiler #1234," or "15 meters from the oak tree at the north end of the plant"). That is, the relative location may be defined in terms of the known landmark, waypoint, or point of reference. The asset tracking device 120a, 120b and may transmit an indication of the relative spatial position to the asset tracking host 110g.

In this example, to initially populate the storage device or database 190 and/or asset tracking devices with landmark, waypoint, or point of reference locations, a portable communication or asset tracking device 120b may be used to determine the absolute locations of the landmarks, waypoints, or frame of references. The asset tracking device 120b may communicate the absolute locations or positions of the landmarks, waypoints, or frame of references to the asset tracking host 110g, and the asset tracking host 110g may determine, based on the absolute locations, the corresponding relative locations of the landmarks, waypoints, or frame of references. The determined relative locations may then be communicated by the asset tracking host 110g via the network 107 to asset tracking devices that are proximately located to the relative locations or positions, in an embodiment. Alternatively or additionally, the determined relative locations may be stored in the storage device 190. Of course, other examples of relative spatial locations may be used by the asset tracking devices 120a, 120b and may be stored at the asset tracking devices 120a, 120b and/or in the storage device 190.

Continuing with FIG. 3, the asset tracking host 110g may receive messages from asset tracking devices 120a, 120b at an asset tracking unit 188. The asset tracking unit 188 may comprise a set of computer-executable instructions stored on a memory and executable to receive messages including spatial positioning information of assets, and may track instances of asset locations. The asset tracking unit 188 may determine asset locations based on received spatial positioning information, and may store the determined asset locations in a data storage device 190 coupled to the asset tracking unit 188. The data storage device 190 may include one or more physical storage devices, and may be locally or remotely located from the asset tracking unit 188. In some embodiments, the data storage device 190 may be accessed by the asset tracking unit 188 via a public network, a private network or some combination of the two.

In some embodiments, the asset tracking unit 188 may receive and store an absolute spatial indication in the storage device 190. In some embodiments, the asset tracking unit 188 may receive an absolute spatial indication, convert the absolute spatial indication into a relative spatial indication, and store at least one of the absolute indication or the relative spatial indication in the storage device 190. In some embodiments, other information or data may be stored in conjunction with the absolute or relative spatial location. For example, an indication of a time corresponding to the determination of the spatial location (e.g., a time stamp which may be easily determined by the time-synchronized network 107) may be stored. An indication of an identification of the sending asset tracking device, an identification of a user of the asset tracking device, and/or any additional data or information sent in conjunction with the spatial position indication (e.g., environmental data or information, operator notes, etc.) may be stored at the storage device 190.

In some embodiments, a plurality of locations of a particular asset that are received over a period time via a plurality of messages may be tracked and stored in the database 190, to provide a historical record of movement of the particular asset throughout the process control environment. In particular, the historical record may include positioning data and/or other information corresponding to the particular asset or corresponding batch (e.g., a pharmaceutical batch) over a length of time. For example, each message (or at least some portion of the contents therein) may be stored in the database 190 along with an indication of a time stamp corresponding to the message. A user or another computing device may request a particular historical record corresponding to one or more assets over a particular time interval, and portions of messages or message contents (or in some embodiments, entire messages) corresponding to the one or more assets and to the particular time interval may be retrieved (e.g., the "historical record" may retrieved). The requested historical record may be displayed on a user interface and/or may be transmitted to a computing device.

Historical records may be particularly useful in process control environments. For example, a time lapse record of a progression of a hazardous condition (e.g., dispersion of a hazardous gas) throughout a plant may be determined by tracking and storing environmental messages corresponding to the hazardous condition as they are reported with spatial location indications and corresponding time stamps. Such historical tracking records may be particularly useful in generating reports on asset movement and/or environmental conditions for regulatory agencies, or in performing forensic analysis on batches or hazardous events. In other examples, tracking of batches in the process control environment over time or personnel movement within the process control environment over time may be particularly useful and may be effected by the techniques described herein.

The asset tracking host 110g may include a user interface 192, which may include a display and a user data entry mechanism (e.g., touch screen, key board, mouse, key pad, buttons, etc.). The user interface 192 may display a location of an asset based on a spatial indication that is received from an asset tracking device, either in real-time as the indication is received at the asset tracking unit 188, or upon retrieval from the storage device 190. The asset location may be displayed on the user interface 192 as an alpha-numeric string and/or as a graphical or pictorial representation.

Figure 6A:
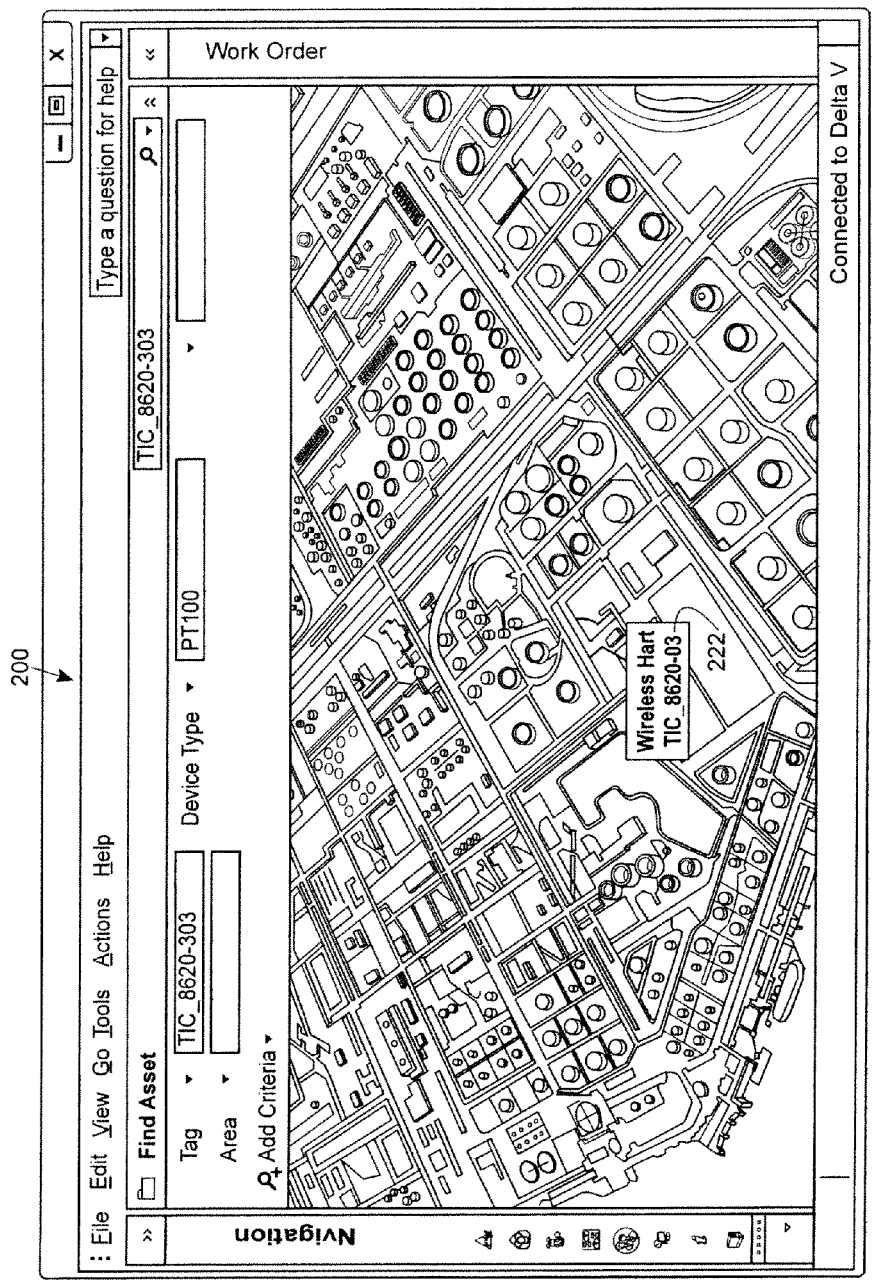
FIG. 6A is a display view of a process control environment that includes an indication of a spatial location of an asset.

In some embodiments, the user interface 192 may display the location of an asset on a map. FIG. 6A illustrates a example of a display view 200 that includes an indication of a location of an asset "TIC_8620-03" (reference 222) and its environs, surrounding area or corresponding region of the plant or facility. The indication of the asset location 222 is shown as an alpha-numeric indication, although other indications may also be used, such as a graphical or pictorial indication, a dynamic indication (e.g., the graphic representing asset "TIC_8620-03" may flash, may be highlighted, or may be otherwise emphasized on the display 200), and/or some other suitable indication. In some embodiments, when the indication of the asset location 222 is selected or hovered over, additional information regarding the asset may be presented (not shown). The additional information may include, for example, absolute spatial positioning coordinates, relative spatial positioning coordinates, data or information that may have been transmitted by an asset tracking device 120a, 120b in conjunction with the spatial position of the asset (e.g., environmental information, operator notes, etc.), configuration information of the asset, asset device description, process data, and the like.

Figure 6B:
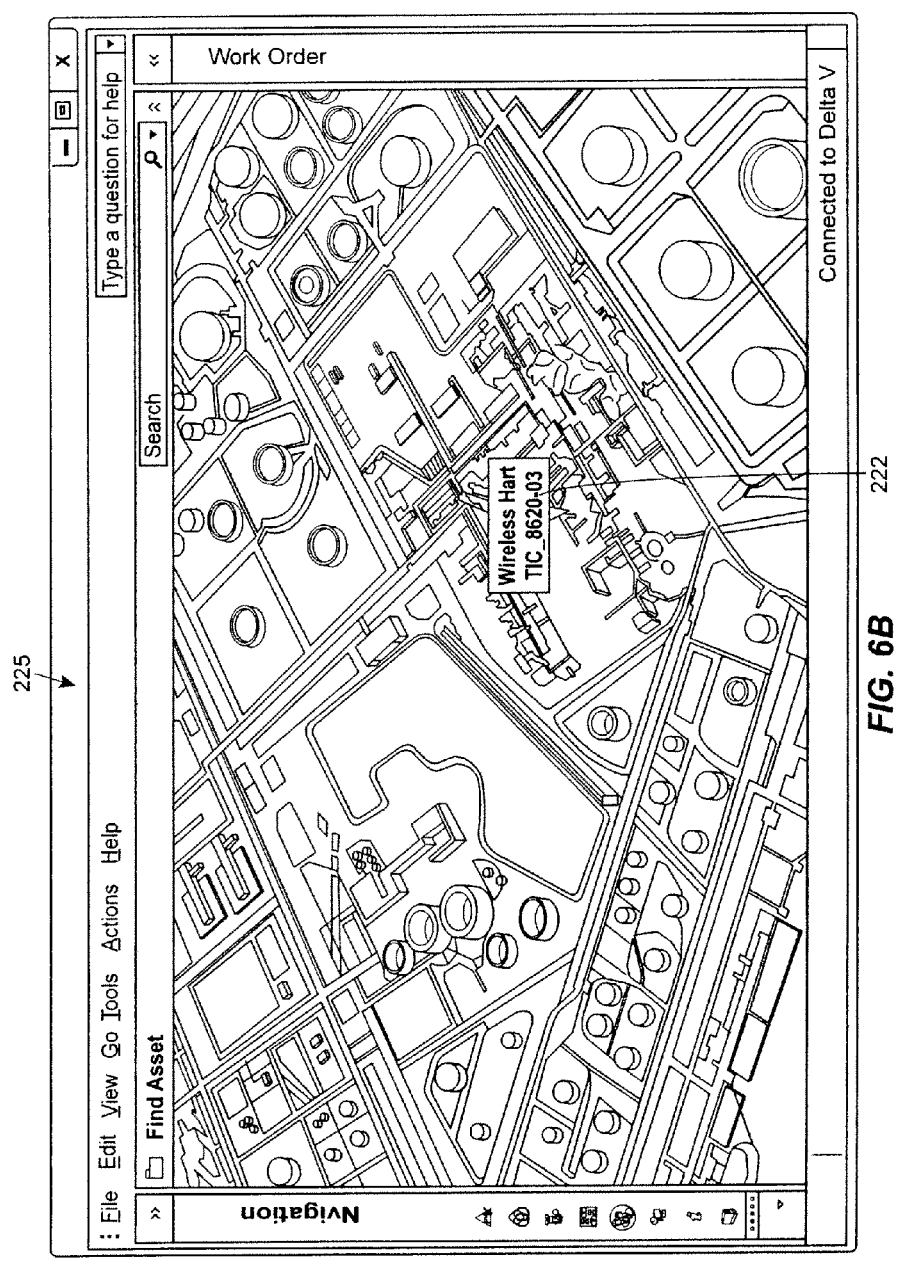
FIGS. 6B and 6C are each subsequent respective enlargements of the display view of FIG. 6A.
Figure 6C:
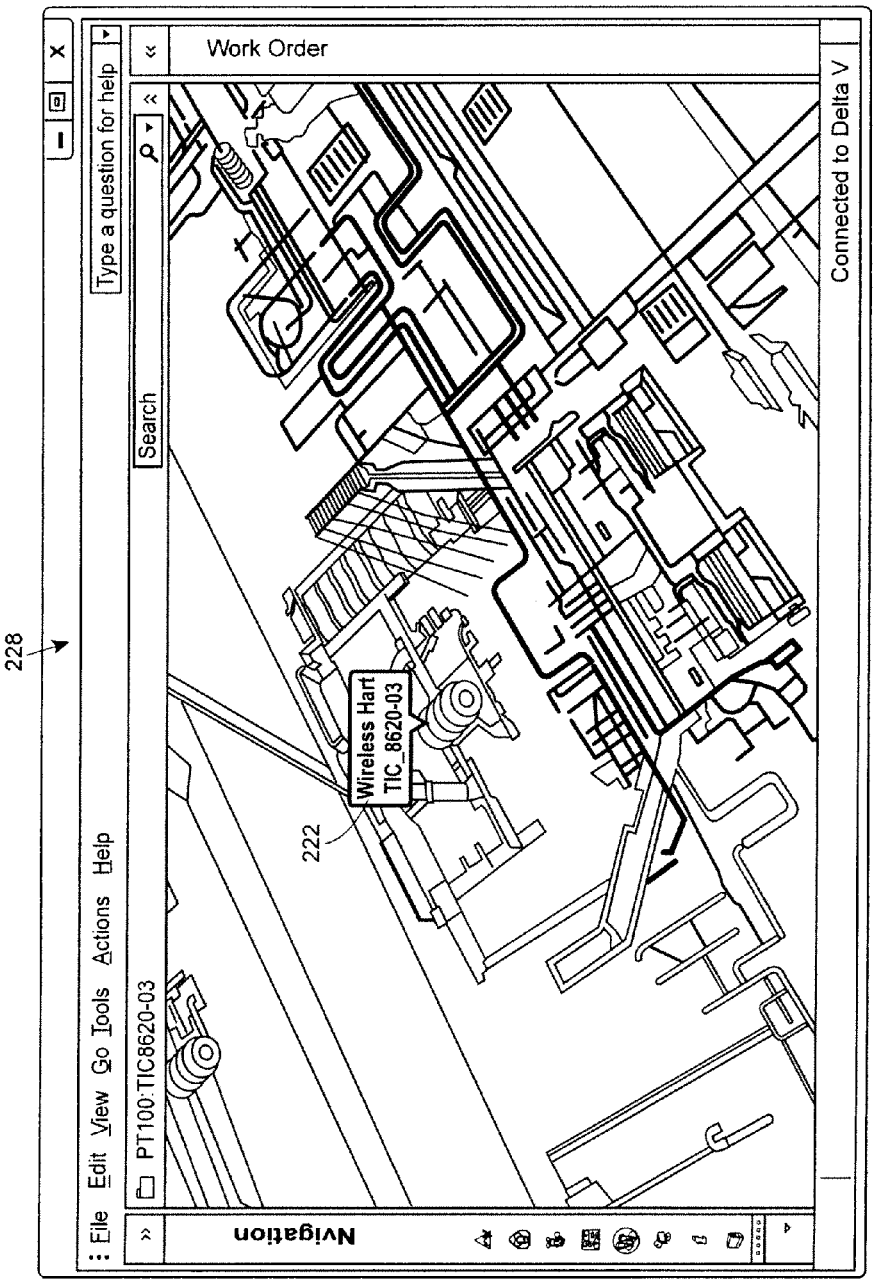

In some embodiments, the display 200 may be enlarged to provide a user with a better view of the location of the asset. FIG. 6B illustrates an enlarged version 225 of the display view 200 shown in FIG. 6A, including the indication of the asset location 222. FIG. 6C illustrates a still further enlarged version of 228 of the display view 200, including the indication of the asset location 222.

Returning again to FIG. 3, in some embodiments, the asset tracking host 110g may include a notification unit 240. The notification unit 240 may comprise a set of computer-executable instructions stored on a memory and executable to generate messages and cause the messages to be transmitted to one or more asset tracking devices from the asset tracking host 110g. In some embodiments, the notification unit 240 may transmit messages in a format that conforms to the industrial automation protocol using the network 107. In some embodiments, the messages generated by the notification unit 240 may be transmitted from the asset tracking host 110g directly to the network 107. In some embodiments, the messages generated by the notification unit 240 may be transmitted to the network 107 via the gateway 115, if the gateway 115 is included in the system 102. The recipient asset tracking devices may or may not be nodes of the network 107. For asset tracking devices that are nodes of the network 107, the messages to the nodal asset tracking devices may be transmitted across the network 107 and then to the nodal asset tracking devices via a fully-enabled link (e.g., the links 109a-109c may be fully-enabled links, such as wireless, fully-enabled links), for example, by using the wireless HART protocol. For asset tracking devices that are not nodes of the network 107, the messages to the non-nodal asset tracking devices may be transmitted across the network 107 and then to the non-nodal asset tracking devices via a join link (e.g., the links 109a-109c may be join links, such as wireless join links), for example, by using the wireless HART protocol.

In some embodiments, based on a message received from an asset tracking device 120b at the asset tracking unit 188, the notification unit 240 may generate an industrial automation protocol message and may transmit the generated message via the network 107 to the portable asset tracking device 120b. The industrial automation protocol message that is generated by the notification unit 240 may include data or information for the person holding the device 120b, such as specific instructions on how to locate a particular other device or item within the process control environment 102, directions to or a location of a nearest exit, directions for a safe passage out of a hazardous area, directions to an injured worker, etc. In some embodiments, contents of the industrial automation protocol message may be manually generated, such as via input received at the user interface 192 of the asset tracking host 110g.

In some embodiments, instead of the notification unit 240 generating a message to the portable asset tracking device 120b or to other asset tracking devices based on a received message, an industrial automation protocol message may generated due to another type of trigger. For example, if a hazardous condition is detected at a particular location in a process plant by a first asset tracking device, and the hazardous condition and location are reported to the asset tracking unit 188 by the first tracking device, the asset tracking unit 188 may automatically search the database 190 to determine any portable asset tracking/communication devices 120b that are located within a determined vicinity of the location of the hazardous condition. The notification unit 240 may automatically generate messages to those devices within the determined vicinity of the hazardous condition to inform the person porting the device of the hazardous condition and/or its location. In an embodiment, the industrial automation protocol message that is sent from the notification unit 240 to a portable asset tracking/communication device 120b may be at least partially displayed on the user interface 148 of the portable asset tracking/communication device 120b.

The asset tracking system 100 affords numerous benefits over presently known techniques of asset location. For example, by leveraging industrial automation protocol messages to transmit spatial positioning information across an existing network 107, the need for a pervasive, extensive second network (e.g., an entire Wi-Fi network or similar) within the process control environment 102 is eliminated, thus providing significant cost savings. Additionally, as devices within the process control environment 102 may be configured as asset tracking devices using existing configuration applications, the need for separate software and other resources designed specifically to identify and track asset location devices and to transfer information to the process control system is also eliminated. Re-radiation of GPS signals within the process control environment 102 enables highly accurate asset locations to be provided, and overlaying asset locations onto system maps enables personnel to more quickly orient themselves to find an asset in the plant or system. Furthermore, by using the asset tracking system 100, other information that is targeted for a specific area of a plant or system may be delivered, such as during an emergency situation.

Figure 7:
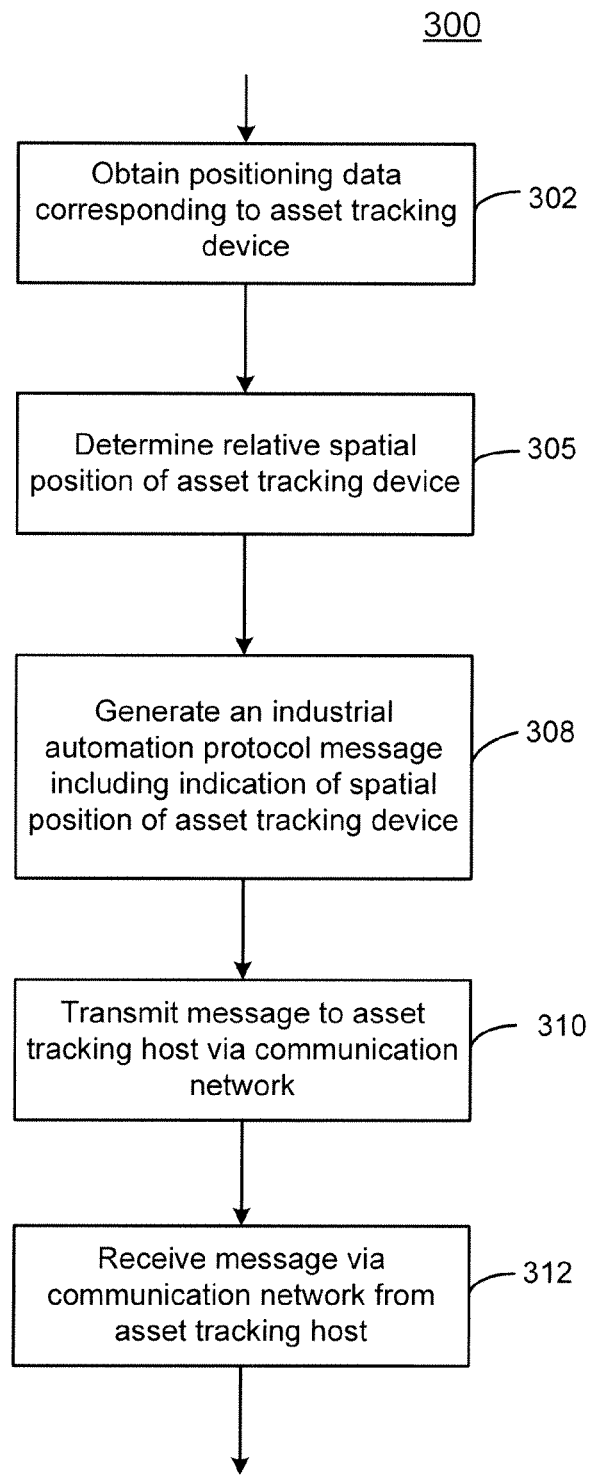
FIG. 7 is an exemplary method of asset tracking that may be performed by an asset tracking device.

FIG. 7 depicts an exemplary method 300 for asset tracking. The method 300 may be used by an asset tracking device such as the asset tracking device 120a or the asset tracking device 120b. In some embodiments, at least a portion of the method 300 may be performed when computer-executable instructions stored on a memory of the asset tracking device are executed by a processor of the asset tracking device. The method 300 may be performed in conjunction with the asset tracking system 100 of FIG. 3, and/or with systems, devices and apparatuses described herein. In other embodiments, the method 300 may be used in conjunction with other systems, devices and apparatuses.

At a block 302, positioning data corresponding to or indicative of the asset tracking device may be obtained. In some embodiments, the obtained positioning data may be absolute positioning data, such as GPS data or data provided by another geo-positioning technology. For example, a particular geo-spatial location or absolute spatial position may be obtained (e.g., a set of three-dimensional coordinates x, y and z; or a latitude/longitude/altitude indication).

In some embodiments of the method 300, a relative spatial location or position may be determined based on the absolute positioning data (block 305). For example, the absolute positioning data may be translated into a relative geo-spatial location or a relative spatial position based on a known landmark, waypoint or point of reference, or based on a virtual grid of the process control environment. The block 305 is optional and may be omitted in some embodiments of the method 300, such as when a passive asset tracking device executes the method 300.

At a block 308, an industrial automation protocol message may be generated. The industrial automation protocol message may conform to any known industrial automation protocol, such as HART, wireless HART, or another industrial automation protocol. The message may include a position indication field. The position indication field may be populated with an indication of the absolute spatial position or location of the asset tracking device, an indication of the relative spatial position or location of the asset tracking device, or indications of both the absolute and the relative spatial positions or locations. In some embodiments, the generated message may include an indication of an identification of the asset tracking device or message source. In some embodiments, the generated message may include an identification of a tracked asset, which may be, in some cases the asset tracking device. The generated message may include an indication of an asset tracking host or message destination, such as the asset tracking host 41 of FIG. 1 or the asset tracking host 110g of FIG. 3. In an embodiment, the position indication field, the indication of the identification of the asset tracking device, and/or the indication of the asset tracking host may be included in one or more user-defined fields of the generated industrial automation protocol message.

At a block 310, the generated message may be transmitted via a communication network to the asset tracking host. For example, the generated message may be transmitted via a plant automation network such as the network 12 of FIG. 1, or the generated message may be transmitted via a wireless communication network, such as the network 107 of FIG. 3.

In some embodiments of the method 300, at an optional block 312, a different industrial automation protocol message may be received at the asset tracking device via the communication network from the asset tracking host. At least a portion of the contents of the message received at the asset tracking device may be presented on a user interface of the asset tracking device, and/or may be stored in a local memory of the asset tracking device. In some embodiments, the block 312 may be omitted, such as when the asset tracking device does not include a user interface.

Figure 8:
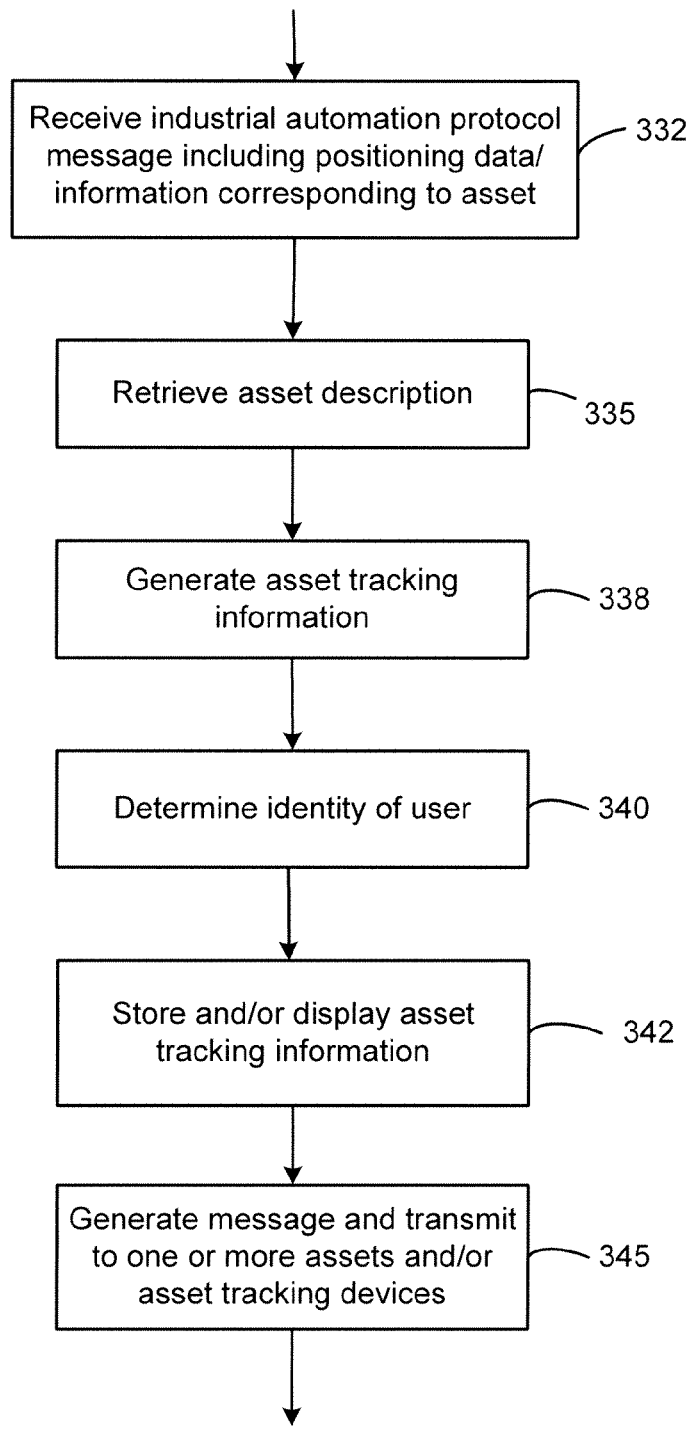
FIG. 8 is an exemplary method asset tracking that may be performed by an asset tracking host.

FIG. 8 depicts an exemplary method 330 for asset tracking. The method 330 may be used by an asset tracking host such as the asset tracking host 41 of FIG. 1 or the asset tracking host 110g of FIG. 3. In some embodiments, at least a portion of the method 330 may be performed when computer-executable instructions stored on a memory of the asset tracking host are executed by a processor of the asset tracking host. The method 330 may be performed in conjunction with the asset tracking system 100 of FIG. 3, and/or with systems, devices and apparatuses described herein. In other embodiments, the method 330 may be used in conjunction with other systems, devices and apparatuses.

At a block 332, an industrial automation protocol message that originated at an asset tracking device may be received at an asset tracking host. The industrial automation protocol message may be received via a plant automation network, such as the plant automation network 12 of FIG. 1, or via a wireless communication network such as the network 107 of FIG. 3. The received message may include an indication of a spatial position or location of an asset or asset tracking device. The indication of the spatial position or location may indicate an absolute location, a relative location, or both an absolute location and a relative location of the asset of or the asset tracking device. The indication of the spatial position may be extracted at the block 332, for example, from one or more user-defined fields in the industrial automation protocol message.

At a block 335, at least a portion of an asset device description corresponding to the asset or asset tracking device indicated in the received message may be retrieved from a database or data storage device, such as from the storage device 190 of FIG. 3. The asset device description may include information that is descriptive of the asset or asset tracking device, including a unique name or unique identifier, corresponding parameters, and the like. In an embodiment, the asset device description may correspond to a population of a configured network device model 155 and extensions corresponding to the asset or asset tracking device.

At a block 338, asset tracking information corresponding to the asset or asset tracking device and based on the received message may be generated. For example, the asset tracking information may include the indication of the location of the asset or asset tracking device and a corresponding time stamp. The asset tracking information may include other information that was transmitted in conjunction with the message, such as environmental information, a text string or graphic sent in conjunction with the location information, and the like.

At an optional block 340, an identity of a user of the asset tracking device may be determined and included in the asset tracking information, such as when the asset tracking device is a portable communication device in the possession of the user. In an example, an indication of the identity of the user may be transmitted from the asset tracking device in conjunction with location information. In another example, the asset tracking unit 188 may use the identification of a particular asset tracking device to determine the identity of the user based on a stored indication of a correspondence between the particular asset tracking device and a user identifier, e.g., a login/password combination, or an equipment assignment record.

At a block 342, the information generated at the block 338 (and at the block 342, if available) may be stored in a database or storage entity, such as the storage entity 190. For example, at least a portion of the information generated at the block 338 may be stored with or associated with the asset description retrieved at the block 335. In some embodiments, at least a portion of the information generated at the block 338 may be presented on a user interface at the asset tracking host (block 342), such as on the user interface 192. In some embodiments, portion(s) of the information generated at the block 338 may be presented on the user interface 192 in conjunction with other data from the database 192, such as with a system map or with other historical data.

In some embodiments, at an optional block 345, one or more industrial automation protocol messages may be generated by the asset tracking host and may be transmitted to one or more asset tracking devices. For example, if, at the block 332, the received message indicated a hazardous condition at a particular location, the asset tracking host may retrieve, from the data storage entity 192, identities of tracked assets within a vicinity of the hazardous condition, and may transmit messages indicating the hazardous condition to tracked assets that are proximally located to (e.g., within a defined distance of) the hazardous condition. In another example, if a dangerous weather condition is predicted (e.g., tornado, high winds, etc.), an industrial automation protocol message including the weather warning may be generated by the asset tracking host and may be broadcast to all portable communication asset tracking devices within the process control environment to warn personnel of the impending inclement weather. The message that is generated and transmitted at the block 345 may include data, information, and/or instructions. In some embodiments, a record of the message transmitted by the asset tracking host may be stored in the database 192.

Although the disclosure describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the disclosure describes example methods and apparatus, persons of ordinary skill in the art will readily appreciate that the examples provided are not the only way to implement such methods and apparatus.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

Although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. An asset tracking method used by an asset tracking device communicatively coupled to a communication network operating according to an industrial automation protocol, the method comprising:

obtaining, by the asset tracking device, positioning data corresponding to the asset tracking device, wherein the positioning data indicates a spatial position of the asset tracking device;

generating, by the asset tracking device, a message that conforms to the industrial automation protocol, including generating a position indication field to indicate the spatial position of the asset tracking device, including the position indication field in the message; and populating the position indication field with at least a portion of the positioning data; and causing the message to be transmitted from the asset tracking device to an asset tracking host via the communication network using the industrial automation protocol, the industrial automation protocol including messages defined for communicating information corresponding to controlling or monitoring process variables in a process control environment.

2. The method of the preceding aspect, wherein generating, by the asset tracking device, the message comprises generating a position indication field to indicate the spatial position of the asset tracking device, including the position indication field in the message; and populating the position indication field with the at least the portion of the positioning data.

3. The method of any of the preceding aspects, wherein the asset tracking device is a field device that performs at least one of controlling or monitoring a process variable used in a control loop in the process control environment; and the asset tracking device is coupled to the communication network via a fully-enabled link to operate as a node in the communication network.

4. The method of any of the preceding aspects, further including at least one of generating alarm data to report an abnormal condition which the field device encounters during operation and wherein the message further includes the alarm data, or generating periodic update data to report periodic measurement of the process variable monitored by the field device and wherein the message further includes the periodic update data.

5. The method of any of the preceding aspects, wherein the asset tracking device is a portable communication device configured to communicate with field devices operating in the process control environment, the field devices each performing at least one of controlling and monitoring a process variable used in a control loop in the process control environment.

6. The method of any of the preceding aspects, wherein causing the message to be transmitted via the communication network includes causing the message to be transmitted to a field device operating in the communication network over a wireless join link, and wherein the wireless join link is configured to support communications between devices operating as nodes in the communication network and devices that do not operate as nodes in the communication network.

7. The method of any of the preceding aspects, wherein obtaining the positioning data includes obtaining absolute positioning information associated with a global positioning system (GPS).

8. The method of any of the preceding aspects, wherein the spatial position is a relative spatial position, and the method further comprises determining the relative spatial position based on the absolute positioning information, the relative spatial position being defined in terms of a point of reference in the communication network.

9. The method of any of the preceding aspects, wherein generating the message that conforms to the industrial automation protocol includes generating the message in accordance with a wireless industrial automation protocol.

10. The method of any of the preceding aspects, wherein the wireless industrial automation protocol is WirelessHART.

11. The method of any of the preceding aspects, wherein generating the message that conforms to the industrial automation protocol comprises generating the message including the position indication field and further including at least one of a measurement or environmental information.

12. A asset tracking device operating in a communication network coupled to a process control environment, wherein the communication network operates according to an industrial automation protocol, the asset tracking device comprising:

a network interface to communicate with the communication network according to the industrial automation protocol, the industrial automation protocol including messages defined specifically for communicating data related to controlling or monitoring process variables in process control environments;

a positioning module to determine a spatial position of at least one of: the asset tracking device, or a target device operating as a first node in the communication network and communicatively coupled to the asset tracking device; and a message generation unit configured to: generate a position indication field populated with an indication of the determined spatial position, generate a message that conforms to the industrial automation protocol and includes the position indication field; and cause the message to be transmitted, using the industrial automation protocol and via the network interface, to a host operating as a second node in the communication network.

13. The asset tracking device of any of the preceding aspects, wherein the message generation unit is further configured to generate a position indication field in the message and populate the position indication field with the indication of the determined spatial position.

14. The asset tracking device of any of the preceding aspects, wherein the positioning module is coupled to a global positioning system (GPS) receiver, and the positioning modules determines the spatial position as a set of spatial coordinates based on a plurality of satellite signals received at the GPS receiver.

15. The asset tracking device of any of the preceding aspects, wherein the target device is physically separate from the asset tracking device; the target device and the asset tracking device are coupled via a communication link; and the message generation unit is configured to cause the message to be transmitted via the network interface, the communication link, and the target device to the host.

16. The asset tracking device of any of the preceding aspects, wherein the communication link is a wireless communication link.

17. The asset tracking device of any of the preceding aspects, wherein the network interface is a wireless interface.

18. The asset tracking device of any of the preceding aspects, wherein the asset tracking device is a field device in the process control environment including a field function module to perform a physical function in the process control environment, and wherein the physical function corresponds to at least one of monitoring or controlling a process variable.

19. The asset tracking device of any of the preceding aspects, wherein:

the asset tracking device is a portable communication device comprising an input device to receive commands from an operator, and an output device to display information to the operator; and wherein the target device is a field device in the process control environment comprising a field function module to perform a physical function in the process control environment, wherein the physical function corresponds to at least one of measuring or controlling a process variable.

20. An asset tracking method performed by a host communicatively coupled to a communication network that operates in a process control environment according to an industrial automation protocol, the method comprising:

receiving, at the host, a message conforming to the industrial automation protocol via the communication network, the industrial automation protocol including messages defined for transmitting data related to controlling or monitoring process variables in the process control environment, and the message including positioning data indicative of a spatial position of an asset associated with the process control environment;

automatically retrieving, using the host, an asset device description from a database, wherein the asset device description includes data descriptive of the asset;

generating, by the host, asset tracking information based on the positioning data and the asset device description; and at least one of: storing, by the host, the asset tracking information in a data storage device, or presenting, by the host, the asset tracking information via a user interface.

21. The method of any of the preceding aspects, wherein the asset is a field device that performs a physical function in the process control environment, wherein the physical function includes at least one of positioning, controlling, measuring or monitoring a process variable used in a control loop of the process control environment; and wherein the asset device description includes at least one of a type of the field device or a unique identifier of the field device.

22. The method of any of the preceding aspects, wherein the message originated from a portable communication device for monitoring and/or controlling field devices in the process control environment, and wherein the message further includes an indication of an identification of the asset.

23. The method of any of the preceding aspects, further comprising generating instructions in view of the positioning data; and transmitting the instructions to the portable communication device via the communication network using the industrial automation protocol.

24. The method of any of the preceding aspects, further comprising determining an identity of a user of the portable communication device.

25. The method of any of the preceding aspects, wherein the positioning data includes global positioning system (GPS) coordinates.

26. The method of any of the preceding aspects, wherein the industrial automation protocol is a wireless communication protocol.

27. The method of any of the preceding aspects, further comprising: displaying, via the user interface, a map of a region corresponding to the spatial position; and wherein presenting the asset tracking information via the user interface includes displaying an indication of the spatial position of the asset on the map of the region.

28. The method of any of the preceding aspects, wherein the indication of the spatial position of the asset includes at least one of: a schematic representation of the asset, a pictorial representation of the asset, or a unique identifier of the asset.

29. The method of any of the preceding aspects, further comprising providing the user interface via a web service.

30. The method of any of the preceding aspects, further comprising: receiving a plurality of messages corresponding to the asset, each message of the plurality of messages including respective positioning data; and storing the respective positioning data in the database to generate historical positioning data corresponding to the asset.

31. An asset tracking host comprising:

a network interface communicatively coupled to communication network operating in a process control environment according to an industrial automation protocol, wherein the industrial automation protocol includes messages defined specifically for communicating data related to controlling or monitoring process variables in the process control environment; and an asset tracking unit coupled to the communication network and configured to: receive a message conforming to the industrial automation protocol via the network interface, the message including positioning data indicative of a spatial position of an asset, retrieve asset device description from a database, wherein the asset device description includes data descriptive of the asset, and generate asset tracking information based on the asset device description and the positioning data.

32. The asset tracking host of any of the preceding aspects, further comprising a connection to a user interface that is configured to display at least one of the asset tracking information, the positioning data, the spatial position, or the asset device description.

33. The asset tracking host of any of the preceding aspects, further comprising a connection to a storage device, and wherein the asset tracking unit is further configured to store at least one of the of the asset tracking information, the positioning data, or the spatial position in the storage device.

34. The asset tracking host of any of the preceding aspects, wherein the communication network is a wireless mesh communication network; and wherein the network interface is coupled to the communication network via a gateway device, wherein the network interface communicates with the gateway device over a wired communication link; and the gateway device communicates with at least one node of the wireless mesh communication network via a wireless communication link.

35. The asset tracking host of any of the preceding aspects, further comprising a notification unit to generate a notification to the asset in view of the positioning data of the asset, and cause the notification to be transmitted to the asset over the communication network via the network interface.

36. An asset tracking system operating in a process control environment, the asset tracking system comprising:
a communication network including a plurality of nodes that communicate using an industrial automation protocol, the industrial automation protocol including messages defined specifically for communicating process data corresponding to one or more respective physical functions of one or more control loops in the process control environment, and the plurality of nodes in the communication network including:
an asset tracking host, and
a plurality of field devices, wherein each field device performs one or more respective physical functions corresponding to one or more control loops in the process control environment; and
an asset tracking device configured to: generate positioning data indicative of a spatial position of the asset tracking device; and provide the positioning data to one of the plurality of field devices;
wherein the one of the plurality of field devices transmits, to the asset tracking host, the positioning data in a message that conforms to the industrial automation protocol.

37. The communication network of any of the preceding aspects, wherein the asset tracking device generates the positioning data based on global positioning system (GPS) signals.

38. The communication network of any of the preceding aspects, further comprising a set of re-radiating antennas to receive the GPS signals and re-radiate the GPS signals to the asset tracking device.

39. The communication network of any of the preceding aspects, wherein the industrial automation protocol is a wireless communication protocol.

40. The asset tracking system of any of the preceding aspects, wherein the message further includes at least one of: environmental information corresponding to the spatial position, or process control data corresponding to the one of the plurality of field devices.

41. An asset tracking method performed by a host communicatively coupled to a communication network that operates in a process control environment according to an industrial automation protocol, the method comprising:
receiving, at the host via the communication network, messages corresponding to a particular asset of the process control environment, the messages conforming to the industrial automation protocol, the industrial automation protocol including messages defined for transmitting data related to controlling or monitoring process variables in the process control environment, and the messages including positioning data indicative of spatial positions of the particular asset;
storing contents of each of the messages and a respective indication of a time stamp in a data storage device; and
presenting at least a portion of the stored contents in response to a request.

42. The asset tracking method of any of the preceding aspects, wherein receiving the messages corresponding to the particular asset comprises receiving messages corresponding to a physical or biological entity associated with the process control environment.

43. The asset tracking method of any of the preceding aspects, wherein the physical entity associated with the process control environment is one of: a field device that performs at least one of controlling or monitoring a process variable used in a control loop in the process control environment, a physical location in the process control environment, a piece of equipment of the process control environment, a material used or produced in the process control environment, or a batch corresponding to the process control environment; and wherein the biological entity associated with the process control environment is a person or animal.

44. The asset tracking method of any of the preceding aspects, wherein presenting the at least the portion of the stored contents comprises presenting the at least the portion of the stored contents on a user interface.

45. The asset tracking method of any of the preceding aspects, wherein presenting the at least the portion of the stored contents comprises sending the at least the portion of the stored contents to a computing device.

46. The asset tracking method of any of the preceding aspects, wherein presenting the at least the portion of the stored contents in response to the request comprises presented the at least the portion of the stored contents in response to a request that includes a time interval.

What is claimed is:
1. An asset tracking method used by an asset tracking device communicatively coupled to a communication network operating according to an industrial automation protocol, the method comprising:
obtaining, by the asset tracking device, absolute positioning information associated with a global positioning system (GPS), the absolute positioning information indicative of an absolute spatial position of the asset tracking device;
determining, by the asset tracking device, a relative spatial position of the asset tracking device based on the absolute positioning information, the relative spatial position defined in terms of one or more measures of distance in one or more directions from a spatial location of a known point of reference in the communication network other than the location of the asset tracking device, wherein the known point of reference is a portion of a structure, fixture, or equipment within a process control environment;

determining, by the asset tracking device, positioning data indicative of the relative spatial position of the asset tracking device;

generating, by the asset tracking device, a message conforming to the industrial automation protocol and including a content corresponding to at least a portion of the positioning data; and causing the message to be transmitted from the asset tracking device to an asset tracking host via the communication network using the industrial automation protocol, the industrial automation protocol including messages defined for communicating information corresponding to controlling or monitoring process variables in the process control environment.

2. The method of claim 1, wherein generating, by the asset tracking device, the message comprises:

generating a position indication field to indicate the relative spatial position of the asset tracking device;

including the position indication field in the message; and populating the position indication field with the at least the portion of the positioning data.

3. The method of claim 1, wherein:

the asset tracking device is a field device that performs at least one of controlling or monitoring a process variable used in a control loop in the process control environment; and the asset tracking device is coupled to the communication network via a fully-enabled link to operate as a node in the communication network.

4. The method of claim 3, further including at least one of:

generating alarm data to report an abnormal condition which the field device encounters during operation and wherein the message further includes the alarm data, or generating periodic update data to report periodic measurement of the process variable monitored by the field device and wherein the message further includes the periodic update data.

5. The method of claim 1, wherein the asset tracking device is a portable communication device configured to communicate with field devices operating in the process control environment, the field devices each performing at least one of controlling and monitoring a process variable used in a control loop in the process control environment.

6. The method of claim 5, wherein causing the message to be transmitted via the communication network includes causing the message to be transmitted to a field device operating in the communication network over a wireless join link, and wherein the wireless join link is configured to support communications between devices operating as nodes in the communication network and devices that do not operate as nodes in the communication network.

7. The method of claim 1, wherein generating the message that conforms to the industrial automation protocol includes generating the message in accordance with a wireless industrial automation protocol.

8. The method of claim 7, wherein the wireless industrial automation protocol is WirelessHART.

9. The method of claim 1, wherein generating the message that conforms to the industrial automation protocol comprises generating the message including the position indication field and further including at least one of a measurement or environmental information.

10. A asset tracking device operating in a communication network coupled to a process control environment, wherein the communication network operates according to an industrial automation protocol, the asset tracking device comprising:

a network interface to communicate with the communication network according to the industrial automation protocol, the industrial automation protocol including messages defined specifically for communicating data related to controlling or monitoring process variables in process control environments;

a positioning module coupled to a global positioning system (GPS) receiver to determine a spatial position of at least one of: (i) the asset tracking device, or (ii) a target device that is operating as a first node in the communication network and (a) that is co-located with the asset tracking device, or (b) into which the asset tracking device is incorporated;

wherein the positioning module determines the spatial position being a relative spatial position determined based on an absolute spatial position determined based on a plurality of satellite signals received at the GPS receiver and the relative spatial position defined in terms of one or more measures of distance in one or more directions from a spatial location of a known point of reference in the process control environment other than the locations of the asset tracking device and the target device, wherein the known point of reference is a portion of a structure, fixture, or equipment within the process control environment; and a message generation unit configured to:

generate a message that conforms to the industrial automation protocol and that includes an indication of the determined spatial position, and cause the message to be transmitted, using the industrial automation protocol and via the network interface, to a host operating as a second node in the communication network.

11. The asset tracking device of claim 10, wherein the message generation unit is further configured to:

generate a position indication field in the message, and populate the position indication field with the indication of the determined spatial position.

12. The asset tracking device of claim 10, wherein:

the target device is physically separate from the asset tracking device;

the target device and the asset tracking device are coupled via a communication link; and the message generation unit is configured to cause the message to be transmitted via the network interface, the communication link, and the target device to the host.

13. The asset tracking device of claim 12, wherein the communication link is a wireless communication link.

14. The asset tracking device of claim 10, wherein the network interface is a wireless interface.

15. The asset tracking device of claim 10, wherein the asset tracking device is a field device in the process control environment including a field function module to perform a physical function in the process control environment, and wherein the physical function corresponds to at least one of monitoring or controlling a process variable.

16. The asset tracking device of claim 10, wherein:

the asset tracking device is a portable communication device; the portable communication device further comprising:

an input device to receive commands from an operator, and an output device to display information to the operator; and the target device is a field device in the process control environment comprising a field function module to perform a physical function in the process control environment, wherein the physical function corresponds to at least one of measuring or controlling a process variable.

17. An asset tracking method performed by a host communicatively coupled to a communication network that operates in a process control environment according to an industrial automation protocol, the method comprising:
receiving, at the host from an asset tracking device incorporated into or co-located with an asset associated with the process control environment, a message conforming to the industrial automation protocol via the communication network, the industrial automation protocol including messages defined for transmitting data related to controlling or monitoring process variables in the process control environment, and the message including positioning data indicative of a spatial position of the asset, the positioning data based on a determination, made by the asset tracking device, of a relativity of the spatial position of the asset to a spatial position of a known exact location in the process control environment other than the locations of the asset tracking device and the asset, wherein such relativity is defined by one or more measures of distance in one or more directions from the spatial position of the known location, and wherein the known exact location indicates a portion of a structure, fixture, or equipment within the process control environment;
automatically retrieving, using the host, an asset device description from a database, wherein the asset device description includes data descriptive of the asset;
generating, by the host, asset tracking information based on the positioning data and the asset device description; and
at least one of:
storing, by the host, the asset tracking information in a data storage device, or
presenting, by the host, the asset tracking information via a user interface.

18. The method of claim 17, wherein:
the asset is a field device that performs a physical function in the process control environment, wherein the physical function includes at least one of positioning, controlling, measuring or monitoring a process variable used in a control loop of the process control environment; and
the asset device description includes at least one of a type of the field device or a unique identifier of the field device.

19. The method of claim 18, wherein the asset tracking device is a portable communication device for monitoring and/or controlling field devices in the process control environment, and wherein the message further includes an indication of an identification of the asset.

20. The method of claim 19, further comprising:
generating instructions in view of the positioning data; and
transmitting the instructions to the portable communication device via the communication network using the industrial automation protocol.

21. The method of claim 19, further comprising determining an identity of a user of the portable communication device.

22. The method of claim 17, wherein the positioning data includes global positioning system (GPS) coordinates.

23. The method of claim 17, wherein the industrial automation protocol is a wireless communication protocol.

24. The method of claim 17, further comprising:
displaying, via the user interface, a map of a region corresponding to the spatial position of the asset; and
wherein presenting the asset tracking information via the user interface includes displaying an indication of the spatial position of the asset on the map of the region.

25. The method of claim 24, wherein the indication of the spatial position of the asset includes at least one of: a schematic representation of the asset, a pictorial representation of the asset, or a unique identifier of the asset.

26. The method of claim 17, further comprising providing the user interface via a web service.

27. The method of claim 17, further comprising:
receiving a plurality of messages corresponding to the asset, each message of the plurality of messages including respective positioning data; and
storing the respective positioning data in the database to generate historical positioning data corresponding to the asset.

28. An asset tracking host comprising:
a network interface communicatively coupled to communication network operating in a process control environment according to an industrial automation protocol, wherein the industrial automation protocol includes messages defined specifically for communicating data related to controlling or monitoring process variables in the process control environment; and
an asset tracking unit coupled to the communication network and configured to:
receive, via the network interface, a message from an asset tracking device incorporated into or co-located with an asset, the message conforming to the industrial automation protocol and including positioning data indicative of a spatial position of the asset, the spatial position of the asset being a relative spatial location determined based on one or more measures of distance in one or more directions from a known absolute spatial location other than the locations of the asset tracking device and the asset, and the relative spatial location determined by the asset tracking device and indicated in terms of the absolute spatial location, and wherein the known absolute spatial location indicates a portion of a structure, fixture, or equipment within the process control environment;
retrieve asset device description from a database, wherein the asset device description includes data descriptive of the asset; and
generate asset tracking information based on the asset device description and the positioning data.

29. The asset tracking host of claim 28, further comprising a connection to a user interface that is configured to display at least one of the asset tracking information, the positioning data, the spatial position of the asset, or the asset device description.

30. The asset tracking host of claim 28, further comprising a connection to a storage device, and wherein the asset tracking unit is further configured to store at least one of the of the asset tracking information, the positioning data, or the spatial position of the asset in the storage device.

31. The asset tracking host of claim 28, wherein:
the communication network is a wireless mesh communication network; and
the network interface is coupled to the communication network via a gateway device, wherein the network interface communicates with the gateway device over a wired communication link; and the gateway device communicates with at least one node of the wireless mesh communication network via a wireless communication link.

32. The asset tracking host of claim 28, further comprising a notification unit to generate a notification to the asset in view of the positioning data of the asset, and cause the notification to be transmitted to the asset over the communication network via the network interface.

33. An asset tracking system operating in a process control environment, the asset tracking system comprising:
a communication network including a plurality of nodes that communicate using an industrial automation protocol, the industrial automation protocol including messages defined specifically for communicating process data corresponding to one or more respective physical functions of one or more control loops in the process control environment, and the plurality of nodes in the communication network including:
an asset tracking host, and
a plurality of field devices, wherein each field device performs one or more respective physical functions corresponding to one or more control loops in the process control environment; and
an asset tracking device configured to:
determine a spatial position of the asset tracking device, the spatial position of the asset tracking device being a relative spatial location determined based on and indicated in terms of one or more measures of distance in one or more directions from a known absolute spatial position, wherein the known point of reference is a portion of a structure, fixture, or equipment within the process control environment;
generate positioning data indicative of the spatial position of the asset tracking device; and
provide the positioning data to one of the plurality of field devices when the asset tracking device is co-located with the one of the plurality of field devices;
wherein the absolute spatial position is of a location in the process control environment other than the locations of the asset tracking device and the one of the plurality of field devices with which the asset tracking device is co-located, and
wherein the one of the plurality of field devices transmits, to the asset tracking host, the positioning data in a message that conforms to the industrial automation protocol.

34. The communication network of claim 33, wherein the asset tracking device generates the positioning data based on global positioning system (GPS) signals.

35. The communication network of claim 34, further comprising a set of re-radiating antennas to receive the GPS signals and re-radiate the GPS signals to the asset tracking device.

36. The communication network of claim 33, wherein the industrial automation protocol is a wireless communication protocol.

37. The asset tracking system of claim 33, wherein the message further includes at least one of: environmental information corresponding to the spatial position of the asset tracking device, or process control data corresponding to the one of the plurality of field devices.

38. An asset tracking method performed by a host communicatively coupled to a communication network that operates in a process control environment according to an industrial automation protocol, the method comprising:
receiving, at the host via the communication network, messages corresponding to a particular asset of the process control environment, the messages conforming to the industrial automation protocol, the industrial automation protocol including messages defined for transmitting data related to controlling or monitoring process variables in the process control environment, and the messages including positioning data indicative of spatial positions of the particular asset, the positioning data indicative of the spatial positions of the particular asset in relation to one or more measures of distance in one or more directions from one or more spatial positions of one or more exact locations, the spatial positions of the particular asset determined by an asset tracking device co-located with or incorporated into the particular asset, and at least one of the exact locations is a known exact location other than the locations of the asset tracking device and the particular asset, wherein the known location indicates a portion of a structure, fixture, or equipment within a process control environment;
storing contents of each of the messages and a respective indication of a time stamp in a data storage device; and
presenting at least a portion of the stored contents in response to a request.

39. The asset tracking method of claim 38, wherein receiving the messages corresponding to the particular asset comprises receiving messages corresponding to a physical or biological entity associated with the process control environment.

40. The asset tracking method claim 39, wherein:
the physical entity associated with the process control environment is one of:
a field device that performs at least one of controlling or monitoring a process variable used in a control loop in the process control environment,
a physical location in the process control environment,
a piece of equipment of the process control environment,
a material used or produced in the process control environment, or
a batch corresponding to the process control environment; and
the biological entity associated with the process control environment is a person.

41. The asset tracking method of claim 38, wherein presenting the at least the portion of the stored contents comprises presenting the at least the portion of the stored contents on a user interface.

42. The asset tracking method of claim 38, wherein presenting the at least the portion of the stored contents comprises sending the at least the portion of the stored contents to a computing device.

43. The asset tracking method of claim 38, wherein presenting the at least the portion of the stored contents in response to the request comprises presented the at least the portion of the stored contents in response to a request that includes a time interval.

* * * * *